(12) United States Patent
Burckhardt et al.

(10) Patent No.: US 8,324,340 B2
(45) Date of Patent: Dec. 4, 2012

(54) POLYURETHANE COMPOSITION WITH GOOD INITIAL STRENGTH

(75) Inventors: Urs Burckhardt, Zurich (CH); Michael Schlumpf, Stallikon (CH)

(73) Assignee: Sika Technology AG, Baar (CH)

( * ) Notice: Subject to any disclaimer, the term of this patent is extended or adjusted under 35 U.S.C. 154(b) by 513 days.

(21) Appl. No.: 12/311,608

(22) PCT Filed: Oct. 31, 2007

(86) PCT No.: PCT/EP2007/061712
§ 371 (c)(1),
(2), (4) Date: Apr. 23, 2009

(87) PCT Pub. No.: WO2008/052999
PCT Pub. Date: May 8, 2008

(65) Prior Publication Data
US 2010/0003526 A1  Jan. 7, 2010

(30) Foreign Application Priority Data
Oct. 31, 2006  (EP) .................................... 06123228

(51) Int. Cl.
*C08G 69/08* (2006.01)
(52) U.S. Cl. ........ 528/310; 560/129; 549/551; 548/546; 428/423.1; 525/458; 156/331.1
(58) Field of Classification Search .................. 528/310; 560/129; 549/551; 548/546
See application file for complete search history.

(56) References Cited

U.S. PATENT DOCUMENTS

| | | | |
|---|---|---|---|
| 4,002,601 A | 1/1977 | Hajek et al. | |
| 4,192,937 A | 3/1980 | Noll et al. | |
| 4,224,417 A | 9/1980 | Hajek et al. | |
| 4,471,102 A | 9/1984 | Petschke | |
| 4,829,122 A | 5/1989 | Pedain et al. | |
| 4,853,454 A | 8/1989 | Merger et al. | |
| 4,879,365 A | 11/1989 | Petschke et al. | |
| 5,087,661 A | 2/1992 | Aoki et al. | |
| 5,166,302 A | 11/1992 | Werner et al. | |
| 5,173,538 A | 12/1992 | Gilch et al. | |
| 5,367,036 A | 11/1994 | Saito et al. | |
| 5,412,056 A | 5/1995 | Zwiener et al. | |
| 6,136,942 A | 10/2000 | Pfenninger et al. | |
| 7,741,425 B2 | 6/2010 | Burckhardt et al. | |
| 2006/0149025 A1 | 7/2006 | Burckhardt | |
| 2008/0251204 A1* | 10/2008 | Burckhardt et al. ........ | 156/331.4 |

FOREIGN PATENT DOCUMENTS

| | | |
|---|---|---|
| CA | 2120860 A1 | 10/1994 |
| CA | 2 267 702 A1 | 10/1999 |
| DE | 20 18 233 A1 | 8/1971 |
| DE | 24 46 438 A1 | 4/1976 |
| DE | 27 32 131 A1 | 1/1979 |
| DE | 43 11 923 A1 | 10/1994 |
| EP | 0 000 029 A1 | 12/1978 |
| EP | 0-141-025 A1 | 5/1985 |
| EP | 0 469 751 A1 | 2/1992 |
| EP | 0 639 628 A1 | 2/1995 |
| EP | 0 947 529 A1 | 10/1999 |
| EP | 0 965 604 A1 | 12/1999 |
| EP | 1 772 447 A1 | 4/2007 |
| EP | 1 775 284 A1 | 4/2007 |
| EP | 177 0 107 | 4/2007 |
| GB | 1 575 666 | 9/1980 |
| JP | A 51-059856 | 5/1976 |
| JP | S 53-60939 | 5/1978 |
| JP | U 60-104119 | 7/1985 |
| JP | A 09-143174 | 6/1997 |
| JP | A 10-101923 | 4/1998 |
| JP | A-2000-072839 | 3/2000 |
| JP | A 2008-532801 | 8/2008 |
| WO | WO 95/00572 | 1/1995 |
| WO | WO 01/14443 A1 | 3/2001 |
| WO | WO 03/006521 A1 | 1/2003 |
| WO | WO 2004/013088 A1 | 2/2004 |
| WO | WO 2006/096057 A1 | 9/2006 |
| WO | WO 2007/036574 A1 | 4/2007 |
| WO | WO 2007/036575 A1 | 4/2007 |

OTHER PUBLICATIONS

Henecka, "Carboxylic acid esters," *Methods of Organic Chemistry*, Eugen Müller (ed.), vol. VIII, Oxygen Compounds III, 1952, Foreword and pp. 516-528 (with English language translation).
Office Action issued Jun. 4, 2012 in copending U.S. Appl. No. 12/449,624.
Jan. 31, 2012 Office Action issued in Japanese Patent Application No. 2010-500287 (with translation).
Apr. 21, 2011 Restriction and Election of Species issued in U.S. Appl. No. 12/449,624.
Jun. 27, 2011 Non-Final Rejection issued in U.S. Appl. No. 12/449,624.
Dec. 22, 2011 Final Rejection issued in U.S. Appl. No. 12/449,624.
U.S. Appl. No. 12/449,624, filed Aug. 21, 2009.
Aug. 14, 2008 International Search Report issued in International Patent Application No. PCT/EP2008/053709.

* cited by examiner

*Primary Examiner* — Shane Fang
(74) *Attorney, Agent, or Firm* — Oliff & Berridge, PLC

(57) ABSTRACT

A one-component, moisture curing composition that has a) at least one polyurethane polymer P1, being liquid at room temperature and having isocyanate groups and b) at least one polyurethane polymer A of the formula (Ia) or (Ib), being solid at room temperature and having aldimine groups with a melting point in the range from 40° C. to 80° C., the composition 1) being capable of being applied warm; 2) having adjustable cure times and a good initial strength with suitable application properties; 3) curing under the influence of humidity without bubbles; and 4) having a good elasticity and mechanical rigidity after curing.

32 Claims, No Drawings

POLYURETHANE COMPOSITION WITH GOOD INITIAL STRENGTH

FIELD OF THE INVENTION

The invention relates to one-component, moisture-curing polyurethane compositions which can be applied warm and comprise a melting component and which are suitable as elastic adhesives with a good initial strength.

DESCRIPTION OF THE PRIOR ART

Polyurethane compositions are put to uses including a variety of adhesive bonds and seals. They are especially suitable for adhesive bonds or seals which require elasticity in the adhesive bond. For certain adhesive applications it is necessary for the adhesive bond to be able to be exposed to a certain mechanical load immediately after the adhesive has been applied, for the reason, for example, that the bonded components are to be moved or a fixing aid is to be removed. In order to allow such early loads, the adhesive bond shall have a good so-called initial strength—that is, it shall be loadable in a certain way at a point in time at which the adhesive has chemically not yet cured. The strength increase profile, moreover, shall be variable within a broad range, so that the open time and initial strength of the adhesive can be adjusted to the requirements of an adhesive-bonding operation.

One-component polyurethane compositions are easy to manage. They cure through reaction with moisture, typically atmospheric moisture, the curing taking place, naturally, from outside to inside. The cure rate decreases toward the inside, since the water that is needed for curing has to diffuse through the increasingly thicker polymer layer ("skin"). On account of the relatively slow curing, it is impossible to achieve good initial strengths with standard one-component polyurethane compositions as adhesives.

Adhesive compositions with good initial strength are, for example, those known as warmmelt adhesives (warmmelts), which have a pastelike to near-solid consistency at room temperature and which for application are heated, typically to a temperature in the range from 40° C. to 80° C. The initial strength of such an adhesive is obtained not primarily through a chemical reaction but instead through a sharp increase in viscosity on cooling, which comes about as a result of the physical solidification of one constituent of the adhesive, known as the melting component. This melting component represents a substance which is solid at room temperature, which melts when the adhesive is heated to the application temperature, and which solidifies again within a certain time, by crystallization, for example, when the adhesive is again cooled.

Warmmelt adhesives in the form of one-component polyurethane compositions are known from U.S. Pat. No. 5,367,036, for example. The composition described therein comprises not only a polyurethane polymer containing isocyanate groups but also a melting component in the form of a nonreactive polyurethane polymer whose isocyanate groups have been reacted with a monomer alcohol. The melting component brings about an increase in viscosity and results in good initial strength. The use of a nonreactive polyurethane polymer as melting component, however, has the disadvantage that, when the composition is cured chemically by means of moisture, the polymer is not incorporated into the polyurethane matrix. The melting component is therefore able to migrate from the cured composition and so give rise to unwanted effects on the surface, or to lead to poorer chemical resistance, lower mechanical strength and/or poorer adhesion properties on the part of the cured composition.

WO 95/00572 A1 describes adhesives which can be applied warm and which comprise a liquid reactive prepolymer and a melting component which is at least partly incompatible with said prepolymer and constitutes preferably a prepolymer having isocyanate endgroups. U.S. Pat. No. 5,166,302 and U.S. Pat. No. 5,173,538 describe adhesive compositions which can be applied warm and hot, respectively, and which as well as a liquid polyurethane polymer comprise a reactive melting component in the form of a polyurethane polymer containing isocyanate groups. The melting components, containing isocyanate groups, that are described in these patent specifications are incorporated into the polyurethane matrix when the adhesive is chemically cured by means of moisture. Within the adhesive, however, on cooling, they have a tendency to solidify very rapidly and hence to lead to a low open time and/or to give rise to stresses in the cured adhesive that may adversely affect the strength of the adhesive bond. Further disadvantages of the reactive melting components described include their limited storage stability and their possibly premature crosslinking, thereby adversely affecting their viscosity and their solidification behavior. Moreover, as a result in particular of the increased isocyanate group content, the curing of the adhesives described may be accompanied by increased instances of bubble formation.

SUMMARY OF THE INVENTION

It is an object of the present invention, therefore, to provide one-component, moisture-curing polyurethane compositions which can be applied warm, which exhibit good initial strength in combination with suitable application properties and adjustable open time, which cure bubble-free by means of moisture, and which, after curing has taken place, possess good elasticity and mechanical strength.

Surprisingly it has been found that compositions according to claim 1 achieve this object. These compositions, in addition to at least one room-temperature liquid polyurethane polymer containing isocyanate groups, comprise at least one melting component in the form of a room-temperature solid polyurethane polymer containing aldimine groups which can be prepared by reacting corresponding polyurethane polymers containing isocyanate groups with specific compounds which comprise one or more aldimine groups and also an active hydrogen, and which is incorporated into the polyurethane matrix when the composition is cured by means of moisture. In one preferred embodiment of the invention the melting component in the composition is a solid polyurethane polymer containing aldimine groups that is entirely free of isocyanate groups. A composition of this kind undergoes particularly little change in its application and curing properties in the course of storage, even, and more particularly, at elevated temperature.

In a further aspect, the invention provides a cured composition according to claim 16, and also provides for the use of the composition as a warmmelt adhesive, and a method of adhesive bonding, and articles resulting from such a method.

In a further aspect, the invention provides a method of influencing the open time and the initial strength of a one-component, moisture-curing polyurethane composition which can be used as a warmmelt adhesive, by subjecting a melting component containing isocyanate groups to preliminary partial or complete reaction with specific compounds which contain one or more aldimine groups and also an active hydrogen.

Finally, in a further aspect, the invention provides a specific polyurethane polymer which contains aldimine groups and which in the melted state is storage-stable—that is, shows little or no change at all in its viscosity and solidification properties, and is outstandingly suitable as a melting component or as a thickener or as a thixotropic agent for one-component polyurethane compositions.

DESCRIPTION OF THE PREFERRED EMBODIMENTS

The invention in a first aspect provides a one-component, moisture-curing composition comprising a) at least one polyurethane polymer P1 which is liquid at room temperature and contains isocyanate groups, and b) at least one polyurethane polymer A which is solid at room temperature, contains aldimine groups, is of the formula (I a) or (I b), and has a melting point in the range from 40° C. to 80° C.

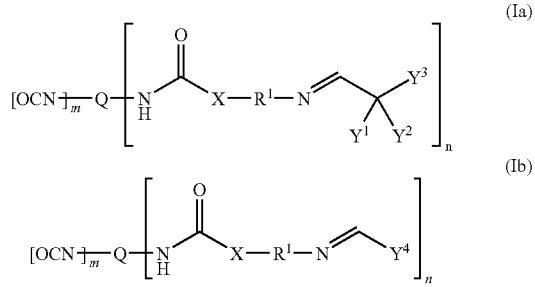

where
Q is the radical of a polyurethane polymer P2, which is solid at room temperature and has a melting point in the range from 40° C. to 80° C., after removal of m+n isocyanate groups;
n is 1 or 2 or 3, and
m is 0 or 1 or 2,
with the proviso that m+n is 2 or 3;
$Y^1$ and $Y^2$ independently of one another either are each a monovalent hydrocarbon radical having 1 to 12 C atoms, or together are a divalent hydrocarbon radical having 4 to 20 C atoms which is part of an unsubstituted or substituted carbocyclic ring having 5 to 8, preferably 6, C atoms;
$Y^3$ is a monovalent hydrocarbon radical which optionally contains at least one heteroatom, more particularly oxygen in the form of ether, carbonyl or ester groups;
$Y^4$ alternatively
is a substituted or unsubstituted aryl or heteroaryl group which has a ring size of between and 8, preferably 6, atoms,
or is

where $R^6$ is a hydrogen atom or is an alkoxy group,
or is a substituted or unsubstituted alkenyl or arylalkenyl group having at least 6 C atoms;
$R^1$ either is a divalent hydrocarbon radical having 2 to 12 C atoms which optionally contains at least one heteroatom, more particularly in the form of ether oxygen or tertiary amine nitrogen, or, if X is N—$R^{2'}$, is together with $R^{2'}$ a trivalent hydrocarbon radical having 4 to 12 C atoms which optionally contains at least one heteroatom, more particularly in the form of ether oxygen or tertiary amine nitrogen;
X is O or is S or is N—$R^2$ or is N—$R^{2'}$, where
$R^2$ either
is a monovalent hydrocarbon radical having 1 to 20 C atoms which optionally contains at least one carboxylic ester, nitrile, nitro, phosphonic ester, sulfonyl or sulfonic ester group,
or is a substituent of the formula (II a) or (II b)

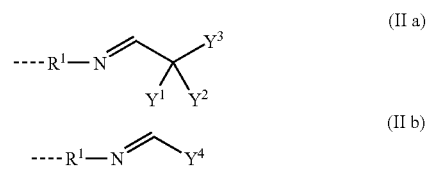

$R^1$, $Y^1$, $Y^2$, $Y^3$, and $Y^4$ having the meanings already mentioned;
and $R^{2'}$ together with $R^1$ is a trivalent hydrocarbon radical having 4 to 12 C atoms which optionally contains at least one heteroatom, more particularly in the form of ether oxygen or tertiary amine nitrogen.

The dashed lines in the formulae in this document in each case represent the bond between a substituent and the rest of the associated molecule.

The one-component, moisture-curing composition is suitable as an adhesive which can be applied warm, more particularly for industrial bonds.

Substance names beginning with "poly", such as polyaldimine, polyisocyanate, polyol, or polyamine, refer in the present document to substances which formally contain two or more per molecule of the functional groups that occur in their name.

The term "polymer" in the present document embraces on the one hand a collective of macromolecules which, while being chemically uniform, differ in respect of degree of polymerization, molar mass, and chain length, and have been prepared by means of a polymerization reaction (addition polymerization, polyaddition or polycondensation). On the other hand the term also embraces derivatives of such a collective of macromolecules from polymerization reactions, in other words compounds which have been obtained by reactions, such as additions or substitutions, for example, of functional groups on existing macromolecules and which may be chemically uniform or chemically nonuniform. The term further embraces what are called prepolymers, in other words reactive oligomeric preadducts whose functional groups have participated in the synthesis of macromolecules.

The term "polyurethane polymer" embraces all polymers which are prepared by the process known as the diisocyanate polyaddition process. This also includes those polymers which are virtually or entirely free of urethane groups. Examples of polyurethane polymers are polyether-polyurethanes, polyester-polyurethanes, polyether-polyureas, polyureas, polyester-polyureas, polyisocyanurates, and polycarbodiimides.

The "melting point" of a substance refers in the present document to the maximum of the heating curve, measured by means of differential scanning calorimetry (DSC) with a heating rate of 2° C./min.

"Room temperature" refers to a temperature of 25° C.

The "initial strength" of a warmmelt adhesive is the strength possessed by an adhesive bond after the joining of the adherends and the cooling of the adhesive to room temperature, at a point in time at which the chemical curing of the adhesive by means of moisture has not yet substantially advanced.

The "open time" of an adhesive refers to the time span, calculated from the point in time at which the adhesive is applied, within which the adherends must at the latest be joined together. The open time in the case of a warmmelt adhesive is determined by the maximum pressing force which can be applied in a manufacturing operation in order to press the applied adhesive, by means of the adherend, to the thickness desired for the adhesive bond. The pressing force ought typically to be not more than 8 N/cm.

The one-component, moisture-curing composition comprises at least one room-temperature liquid polyurethane polymer P1 containing isocyanate groups.

A suitable polyurethane polymer P1 is obtainable for example through the reaction of at least one polyol with at least one polyisocyanate. This reaction may take place by the polyol and the polyisocyanate being brought to reaction by typical techniques, at temperatures of 50° C. to 100° C., for example, where appropriate with the accompanying use of suitable catalysts, the polyisocyanate being metered such that its isocyanate groups are present in a stoichiometric excess in relation to the hydroxyl groups of the polyol. Advantageously the ratio between isocyanate groups and hydroxyl groups is 1.2 to 5, more particularly from 1.5 to 3. Preferably, after all of the hydroxyl groups of the polyol have reacted, a free isocyanate group content of 0.5% to 5% by weight remains, based on the overall polyurethane polymer P1.

Where appropriate the polyurethane polymer P1 can be prepared with the accompanying use of plasticizers, in which case the plasticizers used contain no isocyanate-reactive groups.

Examples of polyols which can be used for the preparation of a polyurethane polymer P1 are the following commercially customary polyols or mixtures thereof:

polyoxyalkylenepolyols, also called polyetherpolyols or oligoetherols, which are polymerization products of ethylene oxide, 1,2-propylene oxide, 1,2- or 2,3-butylene oxide, tetrahydrofuran or mixtures thereof, possibly polymerized by means of a starter molecule having two or more active hydrogen atoms, such as water, ammonia or compounds having two or more OH or NH groups such as 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octane-diols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and also mixtures of the aforementioned compounds. Use may be made both of polyoxyalkylenepolyols which have a low degree of unsaturation (measured according to ASTM D-2849-69 and reported in milliequivalents of unsaturation per gram of polyol (meq/g)), prepared for example with the aid of what are known as double metal cyanide complex catalysts (DMC catalysts), and of polyoxyalkylenepolyols having a higher degree of unsaturation, prepared for example by means of anionic catalysts such as NaOH, KOH, CSOH or alkali metal alkoxides.

Particular suitability is possessed by polyoxyalkylenediols or polyoxyalkylenetriols, more particularly polyoxypropylenediols or polyoxypropylenetriols.

Especially suitable are polyoxyalkylenediols or polyoxyalkylenetriols having a degree of unsaturation of less than 0.02 meq/g and having a molecular weight in the range of 1000-30 000 g/mol, and also polyoxypropylenediols and -triols having a molecular weight of 400-8000 g/mol.

Likewise particularly suitable are what are known as ethylene oxide-terminated ("EO-endcapped", ethylene oxide-endcapped) polyoxypropylenepolyols. The latter are specific polyoxypropylene-polyoxyethylene-polyols which are obtained, for example, by subjecting pure polyoxypropylenepolyols, more particularly polyoxypropylenediols and -triols, after the end of the polypropoxylation reaction, to further alkoxylation with ethylene oxide and which as a result contain primary hydroxyl groups.

Styrene-acrylonitrile- or acrylonitrile-methyl methacrylate-grafted polyetherpolyols.

Polyesterpolyols, also called oligoesterols, prepared for example from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols with organic dicarboxylic acids or their anhydrides or esters such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid or mixtures of the aforementioned acids, and also polyesterpolyols formed from lactones such as ε-caprolactone, for example.

Polycarbonatepolyols of the kind obtainable by reacting, for example, the abovementioned alcohols—those used to synthesize the polyesterpolyols—with dialkyl carbonates, diaryl carbonates or phosgene.

Polyacrylatepolyols and polymethacrylatepolyols.

Polyhydrocarbon-polyols, also called oligohydro-carbonols, such as, for example, polyhydroxy-functional ethylene-propylene, ethylene-butylene or ethylene-propylene-diene copolymers, of the kind prepared, for example, by the company Kraton Polymers, or polyhydroxy-functional copolymers of dienes such as 1,3-butanediene or diene mixtures and vinyl monomers such as styrene, acrylonitrile or isobutylene, or polyhydroxy-functional poly-butadienepolyols, such as those, for example, which are prepared by copolymerization of 1,3-butadiene and allyl alcohol and which may also have been hydrogenated.

Polyhydroxy-functional acrylonitrile/butadiene copolymers of the kind preparable, for example, from epoxides or amino alcohols and carboxyl-terminated acrylonitrile/butadiene copolymers (available commercially under the name Hycar® CTBN from Noveon).

These stated polyols preferably have an average molecular weight of 250-30 000 g/mol, more particularly of 1000-30 000 g/mol, and preferably have an average OH functionality in the range from 1.6 to 3.

Room-temperature solid polyols are suitable only in a relatively small amount as a constituent of a polyol mixture for preparing a room-temperature liquid polyurethane polymer P1.

Further to these stated polyols it is possible to use small amounts of low molecular mass dihydric or polyhydric alcohols such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other polyhydric alcohols, low molecular mass alkoxylation products of the aforementioned dihydric and polyhydric alcohols, and also mixtures of the aforementioned alcohols, in preparing the polyurethane polymer P1.

As polyisocyanates for the preparation of a polyurethane polymer P1 containing isocyanate groups it is possible to make use of commercially customary aliphatic, cycloaliphatic or aromatic polyisocyanates, more particularly diisocyanates, examples being the following:

1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,10-decamethylene diisocyanate, 1,12-dodecamethylene diisocyanate, lysine diisocyanate and lysine ester diisocyanate, cyclohexane 1,3- and 1,4-diisocyanate and any desired mixtures of these isomers, 1-methyl-2,4- and -2,6-diisocyanatocyclohexane and any desired mixtures of these isomers (HTDI or H$_6$TDI), 1-isocyanato-3,3,5-trimethyl-5-isocyanatomethylcyclohexane (i.e., isophorone diisocyanate or IPDI), perhydro-2,4'- and -4,4'-diphenylmethane diisocyanate (HMDI or H$_{12}$MDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1, 3- and -1,4-xylylene diisocyanate (m- and p-TMXDI), bis(1-isocyanato-1-methylethyl)naphthalene, 2,4- and 2,6-tolylene diisocyanate and any desired mixtures of these isomers (TDI), 4,4'-, 2,4'-, and 2,2'-diphenylmethane diisocyanate and any desired mixtures of these isomers (MDI), 1,3- and 1,4-phenylene diisocyanate, 2,3,5,6-tetramethyl-1,4-diisocyanatobenzene, naphthalene 1,5-diisocyanate (NDI), 3,3'- dimethyl-4,4'-diisocyanatobiphenyl (TODI), dianisidine diisocyanate (DADI), oligomers and polymers of the aforementioned isocyanates, and also any desired mixtures of the aforementioned isocyanates. Preference is given to MDI, TDI, HDI, and IPDI.

Typically the polyurethane polymer P1 is present in an amount of 10%-80% by weight, preferably in an amount of 15%-50% by weight, based on the overall composition.

The one-component, moisture-curing composition comprises, in addition to the room-temperature liquid polyurethane polymer P1, a room-temperature solid polyurethane polymer A which contains aldimine groups, is of the formula (I a) or (I b), and has a melting point in the range from 40° C. to 80° C., more particularly in the range from 50° C. to 70° C.,

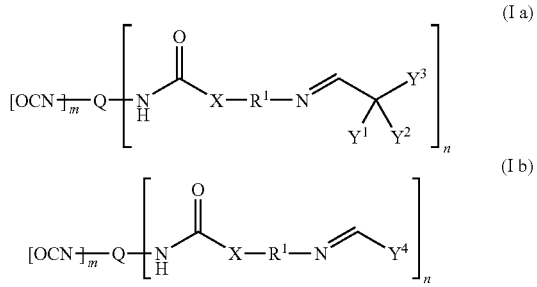

where Q, X, m, n, R$^1$, Y$^1$, Y$^2$, Y$^3$, and Y$^4$ have the aforementioned definitions.

Preferably m+n is 2.

Preferably Y$^1$ and Y$^2$ are each a methyl group.

Preferably Y$^3$ is a radical of the formula (VII') or (VIII')

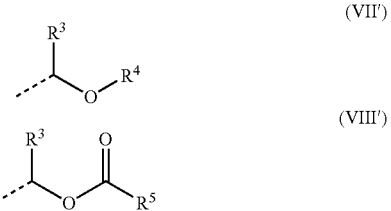

where R$^3$ is a hydrogen atom or is an alkyl or arylalkyl group, preferably a hydrogen atom;
R$^4$ is a hydrocarbon radical having 1 to 30, more particularly 12 to 30, C atoms which optionally contains heteroatoms; and
R$^5$ alternatively
is a hydrogen atom,
or is a linear or branched alkyl radical having 1 to 30, more particularly 11 to 30, C atoms, optionally with cyclic fractions and optionally with at least one heteroatom,
or is a singly or multiply unsaturated, linear or branched hydrocarbon radical having 5 to 30 C atoms,
or is an optionally substituted aromatic or heteroaromatic 5- or 6-membered ring.

On account of its capacity to undergo rapid solidification when a warm-applied mixture comprising a liquid polyurethane polymer P1 containing isocyanate groups is cooled, and hence of bringing about a significant increase in viscosity in the mixture, the polyurethane polymer A is outstandingly suitable as a melting component in compositions which contain isocyanate groups, which are applied warm, i.e., at a temperature in the range from 40° C. to 100° C., more particularly at 40° C. to 80° C., and which possess a good initial strength a short time after application.

The polyurethane polymer A is obtainable through the reaction of a room-temperature solid polyurethane polymer P2 containing isocyanate groups, of the formula (III), having a melting point in the range from 40° C. to 80° C., more particularly in the range from 50° C. to 70° C., with an aldimine D of the formula (IV a) or (IV b) which contains an active hydrogen, where Q, X, m, n, and the radicals R$^1$, Y$^1$, Y$^2$, Y$^3$, and Y$^4$ have the aforementioned definitions.

This reaction is carried out advantageously at a temperature at which the polyurethane polymer P2 is present in the liquid state, where appropriate with the accompanying use of suitable catalysts, the aldimine D being metered stoichiometrically, slightly superstoichiometrically or substoichiometrically in relation to the isocyanate groups of the polyurethane polymer P2.

In a first embodiment the aldimine D is metered substoichiometrically in relation to the isocyanate groups of the polyurethane polymer P2: that is, with less than one mole equivalent of moieties, "HX" per mole equivalent of isocyanate groups. In this way the above-described composition comprises at least one polyurethane polymer A, containing isocyanate groups and aldimine groups, for which, therefore, the index m in formula (I a) or formula (I b) is 1 or 2, preferably 1.

In a second embodiment the aldimine D is metered stoichiometrically or slightly superstoichiometrically in relation to the isocyanate groups of the polyurethane polymer P2: that is, with exactly one or somewhat more than one mole equivalent of moieties "HX" per mole equivalent of isocyanate groups. In this way, room-temperature solid polyurethane polymers A, containing aldimine groups, are produced which contain no isocyanate groups, and for which, therefore, the index m in formula (I a) or formula (I b) is zero and which are referred to below as polyurethane polymers A1.

Preferred polyurethane polymers A are polyurethane polymers A1, since, on account of the absence of isocyanate groups, they are particularly storage-stable even at elevated temperature. More particularly, the polyurethane polymer A1 can be stored in the liquid state, in other words at a temperature above its melting point, for a relatively long time, typically for a number of weeks or months, without any significant rise in its viscosity. This contrasts with the behavior of melting components containing isocyanate groups that are of the kind known from the prior art. Owing to the high reactivity of the isocyanate groups, the viscosity of such melting components increases typically rapidly on storage, more particularly at elevated temperature, and this can go as far as gelling. The good storage stability of the polyurethane polymer A is of considerable practical importance, since as a result of this quality the composition of the invention undergoes little or no change in its application and curing properties during storage, even at elevated temperature, and more particularly exhibits largely constant values for open time and initial strength that show little dependence on the manufacturing date or storage conditions.

Likewise preferred are polyurethane polymers A in which X in formula (I a) or (I b) is oxygen or is N—$R^2$ or is N—$R^{2'}$.

Especially preferred polyurethane polymers A are those in which X in formula (I a) or (I b) is oxygen or is N—$R^2$, where $R^2$ is a hydrocarbon radical having 1 to 4 C atoms, more particularly methyl, ethyl, propyl or butyl, preferably methyl. Compositions comprising these melting components exhibit a rapid increase in initial strength.

Preferred polyurethane polymers A are those of the formula (I a). Especially preferred are polyurethane polymers A of the formula (I a) in which $Y^3$ is a radical of the formula (VII') or (VIII'), with $R^4$ in formula (VII') being a hydrocarbon radical having 12 to 30 C atoms, and with $R^5$ in formula (VIII') being a linear or branched alkyl radical having 11 to 30 C atoms. These preferred polyurethane polymers A are odorless.

Particularly preferred polyurethane polymers A are polyurethane polymers A2 of the formula (I a') or (I b'), which represent a specific selection of the polyurethane polymer A which is solid at room temperature, contains aldimine groups, and is of the formula (I a) or (I b)

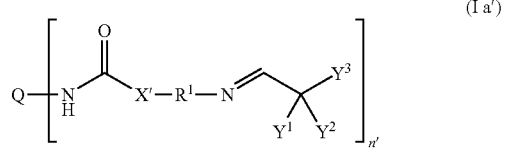

(I a')

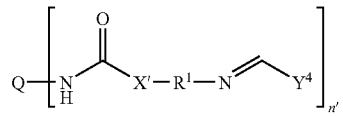

(I b')

where, in formula (I a') and (I b'),
n' is 2 or 3, more particularly 2;
X' is O or is N—$R^2$ or is N—$R^{2'}$, where
 $R^2$ either
  is an alkyl group having 1 to 4 C atoms, more particularly methyl,
 or is —$CHR^7$—$CH_2R^8$, where
  $R^7$ is a hydrogen atom or is —$COOR^9$ and
  $R^8$ is —$COOR^9$ or —$CONHR^9$ or —$CONR^9_2$,
   $R^9$ being an alkyl group having 1 to 4 C atoms,
and Q, $R^1$, $R^{2'}$, $Y^1$, $Y^2$, $Y^3$, and $Y^4$ have the definitions already described.

Compositions comprising polyurethane polymers A2 have a particularly good storage stability.

Particularly preferred polyurethane polymers A2 are those in which X' is O or N—$R^2$, where $R^2$ is an alkyl group having 1 to 4 C atoms, more particularly methyl. Compositions comprising these polyurethane polymers A2 exhibit not only a particularly good storage stability but also a rapid development of initial strength.

One suitable polyurethane polymer P2 for preparing a polyurethane polymer A is obtainable through the reaction of at least one polyol with at least one polyisocyanate by known methods, substantially in the same way as already described for the polyurethane polymer P1.

In one preferred embodiment the polyurethane polymer P2 is prepared via a reaction of at least one polyisocyanate and at least one polyol, the isocyanate groups being present in stoichiometric excess over the hydroxyl groups. Advantageously the ratio between isocyanate groups and hydroxyl groups is 1.3 to 2.5, more particularly 1.5 to 2.2.

Particularly suitable polyols for preparing a polyurethane polymer P2 are on the one hand polyesterpolyols, also called oligoesterols, prepared, for example, from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, with organic dicarboxylic acids or their anhydrides or esters, such as, for example, succinic acid, glutaric acid, adipic acid, pimelic acid, suberic acid, azelaic acid, sebacic acid, dodecanedicarboxylic acid, maleic acid, fumaric acid, phthalic acid, isophthalic acid, terephthalic acid, and hexahydrophthalic acid, or mixtures of the aforementioned acids, and also polyesterpolyols formed from lactones such as ε-caprolactone, for example.

Preference is given to room-temperature liquid, amorphous, partly crystalline, and crystalline polyesterdiols and -triols, especially polyesterdiols. Suitable room-temperature liquid polyesterdiols are solid not far below room temperature, at temperatures between 0° C. and 25° C., for example, and are always used in combination with at least one amorphous, partly crystalline or crystalline polyesterpolyol.

Particularly preferred polyesterdiols are adipic acid/hexanediol polyesters, azelaic acid/hexanediol polyesters, and dodecanedicarboxylic acid/hexanediol polyesters having a melting point in the range from 40° C. to 80° C., more particularly 50° C. to 70° C.

Particularly suitable polyols for preparing a polyurethane polymer P2 on the other hand are polycarbonatepolyols of the kind accessible by reaction, for example, of the abovementioned alcohols—those used to synthesize the polyesterpolyols—with dialkyl carbonates, such as dimethyl carbonate, diaryl carbonates, such as diphenyl carbonate, or phosgene. Particularly suitable are room-temperature liquid, amorphous, partly crystalline or crystalline polycarbonatediols. Suitable room-temperature liquid polycarbonatediols are solid not far below room temperature, at temperatures between 0° C. and 25° C., for example, and are always used in combination with at least one amorphous, partly crystalline or crystalline polycarbonatepolyol.

Polycarbonatediols are preferred.

Particular preference is given to polycarbonatediols based on hexanediol.

Polyisocyanates suitable for preparing a polyurethane polymer P2 are the same as those for preparing a polyurethane polymer P1.

Preference is given to the diisocyanates, more particularly MDI, TDI, HDI, and IPDI. MDI is particularly preferred.

The polyurethane polymer P2 is solid at room temperature and has a melting point in the range from 40° C. to 80° C., more particularly in the range from 50° C. to 70° C.

The polyurethane polymer P2 has a molecular weight of preferably 500 g/mol or more. More particularly the polyurethane polymer P2 has a molecular weight of 1000 to 30 000 g/mol, preferably of 2000 to 10 000 g/mol. Furthermore, the polyurethane polymer P2 preferably has an average functionality in the range from 1.8 to 2.2.

An aldimine D of the formula (IV a) or (IV b) that is suitable for reaction with a polyurethane polymer P2 is obtainable by a condensation reaction, with elimination of water, between an amine of the formula (V) and an aldehyde of the formula (VI a) or (VI b). The aldehyde in this case is used stoichiometrically or in a stoichiometric excess in relation to the primary aliphatic amino groups of the amine of the formula (V).

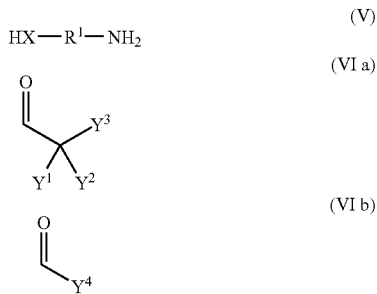

In the formulae (V), (VI a), and (VI b), X, $R^1$, $Y^1$, $Y^2$, $Y^3$, and $Y^4$ have the aforementioned definitions.

The term "primary amino group" in the present document refers to an $NH_2$ group which is attached to an organic radical, whereas the term "secondary amino group" refers to an NH group which is attached to two organic radicals, which may also together be part of a ring.

An "aliphatic amino group" is an amino group which is attached to an aliphatic, cycloaliphatic or arylaliphatic radical. It therefore differs from an "aromatic amino group", which is bonded directly to an aromatic or heteroaromatic radical, such as in aniline or 2-aminopyridine, for example.

Suitability as amine of the formula (V) is possessed, in a first embodiment, by compounds having one or two primary aliphatic, and one secondary, amino group(s), such as, for example, N-methyl-1,2-ethanediamine, N-ethyl-1,2-ethanediamine, N-butyl-1,2-ethanediamine, N-hexyl-1,2-ethanediamine, N-(2-ethylhexyl)-1,2-ethanediamine, N-cyclohexyl-1,2-ethanediamine, 4-aminomethylpiperidine, 3-(4-aminobutyl)piperidine, N-aminoethylpiperazine, diethylenetriamine (DETA), bishexamethylenetriamine (BHMT); diamines and triamines from the cyanoethylation or cyanobutylation of primary monoamines and diamines, examples being N-methyl-1,3-propanediamine, N-ethyl-1,3-propanediamine, N-butyl-1,3-propanediamine, N-hexyl-1,3-propanediamine, N-(2-ethylhexyl)-1,3-propanediamine, N-dodecyl-1,3-propanediamine, N-cyclohexyl-1,3-propanediamine, 3-methylamino-1-pentylamine, 3-ethylamino-1-pentylamine, 3-butylamino-1-pentylamine, 3-hexylamino-1-pentylamine, 3-(2-ethylhexyl)amino-1-pentylamine, 3-dodecylamino-1-pentylamine, 3-cyclohexylamino-1-pentylamine, dipropylenetriamine (DPTA), N3-(3-aminopentyl)-1,3-pentanediamine, N5-(3-aminopropyl)-2-methyl-1,5-pentanediamine, N5-(3-amino-1-ethylpropyl)-2-methyl-1,5-pentanediamine, and fatty diamines such as N-cocoalkyl-1,3-propanediamine, N-oleyl-1,3-propanediamine, N-soyaalkyl-1,3-propanediamine, N-tallowalkyl-1,3-propanediamine or N—($C_{16-22}$ alkyl)-1,3-propanediamine, of the kind obtainable, for example, under the trade name Duomeen® from Akzo Nobel; the products from the Michael-like addition of aliphatic primary diamines or triamines with acrylonitrile, maleic or fumaric diesters, citraconic diesters, acrylic and methacrylic esters, acrylamides and methacrylamides, and itaconic diesters, reacted in a molar ratio of 1:1.

Suitability as amine of the formula (V) is possessed in a second embodiment by aliphatic hydroxyamines, such as, for example, 2-aminoethanol, 2-methylaminoethanol, 1-amino-2-propanol, 3-amino-1-propanol, 4-amino-1-butanol, 4-amino-2-butanol, 2-amino-2-methylpropanol, 5-amino-1-pentanol, 6-amino-1-hexanol, 7-amino-1-heptanol, 8-amino-1-octanol, 10-amino-1-decanol, 12-amino-1-dodecanol, 4-(2-aminoethyl)-2-hydroxyethylbenzene, 3-aminomethyl-3,5,5-trimethylcyclohexanol; derivatives, carrying one primary amino group, of glycols such as diethylene glycol, dipropylene glycol, dibutylene glycol, and higher oligomers and polymers of these glycols, examples being 2-(2-aminoethoxy)ethanol, triethylene glycol-monoamine, α-(2-hydroxymethylethyl)-ω-(2-amino-methylethoxy)poly(oxy(methyl-1,2-ethanediyl)); derivatives, carrying one hydroxyl group and primary amino group, of polyalkoxylated trihydric or higher polyhydric alcohols; products from the simple cyanoethylation and subsequent hydrogenation of glycols, examples being 3-(2-hydroxyethoxy)propylamine, 3-(2-(2-hydroxyethoxy)ethoxy)propylamine, and 3-(6-hydroxyhexyloxy)propylamine.

Suitability as amine of the formula (V) is possessed, in a third embodiment, by aliphatic mercapto amines, such as, for example, 2-aminoethanethiol (cysteamine), 3-aminopropanethiol, 4-amino-1-butanethiol, 6-amino-1-hexanethiol, 8-amino-1-octanethiol, 10-amino-1-decanethiol, 12-amino-1-dodecanethiol and amino thio sugars such as 2-amino-2-deoxy-6-thioglucose.

Preferred amines of the formula (V) are amines which are selected from the group consisting of N-methyl-1,2-ethanediamine, N-ethyl-1,2-ethanediamine, N-cyclohexyl-1,2-ethanediamine, N-methyl-1,3-propanediamine, N-ethyl-1,3-propanediamine, N-butyl-1,3-propanediamine, N-cyclohexyl-1,3-propanediamine, 4-aminomethylpiperidine, 3-(4-aminobutyl)piperidine, DETA, DPTA, BHMT, fatty diamines, such as N-cocoalkyl-1,3-propanediamine, N-oleyl-1,3-propanediamine, N-soyaalkyl-1,3-propanediamine, and N-tallowalkyl-1,3-propanediamine; products from the Michael-like addition of aliphatic primary diamines with maleic and fumaric diesters, acrylic and methacrylic esters, acrylamides and methacrylamides, preferably with maleic diesters, more particularly dimethyl, diethyl, dipropyl, and dibutyl maleate, and with acrylic esters, more particularly methyl acrylate, reacted in a molar ratio of 1:1; aliphatic hydroxy- or mercaptoamines in which the primary amino group are separated from the hydroxyl or mercapto group by a chain of at least five atoms, or by a ring, more particularly 5-amino-1-pentanol, 6-amino-1-hexanol, and higher homologs thereof, 4-(2-aminoethyl)-2-hydroxyethylbenzene, 3-aminomethyl-3,5,5-trimethylcyclohexanol, 2-(2-aminoethoxy)ethanol, triethylene glycol-monoamine and higher oligomers and polymers thereof, 3-(2-hydroxyethoxy)-propylamine, 3-(2-(2-hydroxyethoxy)ethoxy)propylamine, and 3-(6-hydroxyhexyloxy)propylamine.

Particularly preferred amines of the formula (V) are those in which X is oxygen or is N—$R^2$, $R^2$ being an alkyl group having 1 to 4 C atoms, more particularly methyl, ethyl, propyl or butyl, preferably methyl. Polyurethane polymers A of the formula (I a) or (I b) that are prepared therewith have the property of giving compositions of the invention that feature rapid development of the initial strengths.

Suitability for preparing an aldimine D of the formula (IV a) or (IV b) is possessed by aldehydes of the formula (VI a) or (VI b). A property of these aldehydes is that their radicals $Y^1$, $Y^2$, $Y^3$, and $Y^4$ do not contain any moieties which in the absence of water are reactive with isocyanate groups; more particularly, $Y^1$, $Y^2$, $Y^3$, and $Y^4$ do not contain any hydroxyl groups, any primary or secondary amino groups, any urea groups or any other groups containing active hydrogen.

For preparing an aldimine D of the formula (IV a) or (IV b), suitability is possessed, firstly, by aldehydes of the formula (VI a), where $Y^1$, $Y^2$, and $Y^3$ have the definitions already stated.

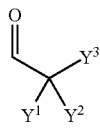

(VI a)

Aldehydes of the formula (VI a) are tertiary aliphatic or tertiary cycloaliphatic aldehydes, such as, for example, pivalaldehyde (2,2-dimethylpropanal), 2,2-dimethylbutanal, 2,2-diethylbutanal, 1-methylcyclopentanecarboxaldehyde, 1-methylcyclohexanecarboxaldehyde; and also ethers of 2-hydroxy-2-methylpropanal and alcohols such as propanol, isopropanol, butanol and 2-ethylhexanol; esters of 2-formyl-2-methylpropionic acid or 3-formyl-3-methylbutyric acid and alcohols such as propanol, isopropanol, butanol, and 2-ethylhexanol; esters of 2-hydroxy-2-methylpropanal and carboxylic acids such as butyric acid, isobutyric acid, and 2-ethylhexanoic acid; and also the ethers and esters, described below as being particularly suitable, of 2,2-disubstituted 3-hydroxypropanals, -butanals or analogous higher aldehydes, more particularly of 2,2-dimethyl-3-hydroxypropanal.

Particularly suitable aldehydes of the formula (VI a) in a first embodiment are aldehydes of the formula (VII) with a radical $Y^3$ of the formula (VII'),

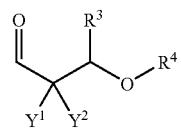

(VII)

where
$R^3$ is a hydrogen atom or an alkyl or arylalkyl group,
$R^4$ is a hydrocarbon radical having 1 to 30 C atoms which optionally contains heteroatoms, and
$Y^1$ and $Y^2$ have the definitions already stated.

In formula (VII) $Y^1$ and $Y^2$ are each preferably a methyl group, and $R^3$ is preferably a hydrogen atom.

Aldehydes of the formula (VII) represent ethers of aliphatic, araliphatic or cycloaliphatic, 2,2-disubstituted 3-hydroxy aldehydes with alcohols of the formula HO—$R^4$, such as fatty alcohols, for example. Suitable 2,2-disubstituted 3-hydroxy aldehydes are obtainable in turn from aldol reactions, especially crossed aldol reactions, between primary or secondary aliphatic aldehydes, especially formaldehyde, and secondary aliphatic, secondary araliphatic or secondary cycloaliphatic aldehydes, such as, for example, 2-methylbutyraldehyde, 2-ethylbutyraldehyde, 2-methylvaleraldehyde, 2-ethylcaproaldehyde, cyclopentanecarboxaldehyde, cyclohexanecarboxaldehyde, 1,2,3,6-tetrahydrobenzaldehyde, 2-methyl-3-phenylpropionaldehyde, 2-phenylpropionaldehyde (hydratropaldehyde) or diphenylacetaldehyde.

Examples of such aldehydes of the formula (VII) include 2,2-dimethyl-3-(2-ethylhexyloxy)propanal, 2,2-dimethyl-3-lauroxypropanal and 2,2-dimethyl-3-stearoxypropanal.

In a second embodiment particularly suitable aldehydes of the formula (VI a) are aldehydes of the formula (VIII) with a radical $Y^3$ of the formula (VIII').

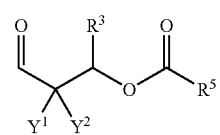

(VIII)

In formula (VIII)
$R^3$ is a hydrogen atom or an alkyl or arylalkyl group,
$R^5$
  alternatively is a hydrogen atom,
  or is a linear or branched alkyl radical having 1 to 30 C atoms, optionally with cyclic fractions and optionally with at least one heteroatom,
  or is a singly or multiply unsaturated, linear or branched hydrocarbon radical having 5 to 30 C atoms,
  or is an optionally substituted aromatic or heteroaromatic 5- or 6-membered ring,
and $Y^1$ and $Y^2$ have the definitions already stated.

In formula (VIII) $Y^1$ and $Y^2$ are each preferably a methyl group, and $R^3$ is preferably a hydrogen atom.

Compounds of the formula (VIII) represent esters of the above-described 2,2-disubstituted 3-hydroxy aldehydes, such as, for example, 2,2-dimethyl-3-hydroxypropanal, 2-hydroxymethyl-2-methylbutanal, 2-hydroxymethyl-2-ethylbutanal, 2-hydroxymethyl-2-methylpentanal, 2-hydroxymethyl-2-ethylhexanal, 1-hydroxymethylcyclopentanecarboxaldehyde, 1-hydroxymethylcyclohexanecarboxaldehyde, 1-hydroxymethylcyclohex-3-enecarboxaldehyde, 2-hydroxymethyl-2-methyl-3-phenylpropanal, 3-hydroxy-2-methyl-2-phenylpropanal and 3-hydroxy-2,2-diphenylpropanal, with suitable carboxylic acids.

Examples of suitable carboxylic acids are firstly aliphatic carboxylic acids, such as formic acid, acetic acid, propionic acid, butyric acid, isobutyric acid, valeric acid, caproic acid, 2-ethylcaproic acid, capric acid, lauric acid, tridecanoic acid, myristic acid, pentadecanoic acid, palmitic acid, margaric acid, stearic acid, nonadecanoic acid, arachidic acid, palmitoleic acid, oleic acid, erucic acid, linoleic acid, linolenic acid, eleostearic acid, arachidonic acid, fatty acids from the industrial saponification of natural oils and fats, such as, for example, rapeseed oil, sunflower oil, linseed oil, olive oil, coconut oil, oil palm kernel oil, and oil palm oil, and also technical mixtures of fatty acids which comprise such acids. Suitable carboxylic acids are secondly aromatic carboxylic acids, examples being benzoic acid or the positionally isomeric toluic acids, ethyl- or isopropyl- or tert-butyl- or methoxy- or nitrobenzoic acids.

Preferred aldehydes of the formula (VIII) are 2,2-dimethyl-3-lauroyloxypropanal, 2,2-dimethyl-3-myristoyloxypropanal, 2,2-dimethyl-3-palmitoyloxypropanal, 2,2-dimethyl-3-stearoyloxypropanal and 2,2-dimethyl-3-benzoyloxypropanal, and also analogous esters of other 2,2-disubstituted 3-hydroxy aldehydes.

In one particularly preferred embodiment $R^5$ is selected from the group consisting of phenyl and the $C_{11}$, $C_{13}$, $C_{15}$, and $C_{17}$ alkyl groups.

Particular preference is given to 2,2-dimethyl-3-lauroyloxypropanal.

In one preferred preparation method of an aldehyde of the formula (VIII), a 2,2-disubstituted 3-hydroxy aldehyde, 2,2-dimethyl-3-hydroxypropanal for example, which can be prepared, for example, from formaldehyde (or paraformaldehyde) and isobutyraldehyde, optionally in situ, is reacted with a carboxylic acid to form the corresponding ester. This esterification can take place without the use of solvents by known methods, described for example in Houben-Weyl, "Methoden der organischen Chemie", vol. VIII, pages 516-528.

In one particularly preferred embodiment the aldehydes of the formula (VI a) are odorless. An odorless substance is a substance whose odor is so low that it cannot be smelt by the majority of human individuals, i.e., cannot be perceived with the nose.

Odorless aldehydes of the formula (VI a) are firstly, in particular, aldehydes of the formula (VII) in which the radical $R^4$ is a hydrocarbon radical having 12 to 30 carbon atoms which optionally contains heteroatoms.

Secondly, odorless aldehydes of the formula (VI a) are, in particular, aldehydes of the formula (VIII) in which the radical $R^5$ either is a linear or branched alkyl chain having 11 to 30 C atoms, optionally with at least one heteroatom, and more particularly with at least one ether oxygen, or is a singly or multiply unsaturated, linear or branched hydrocarbon chain having 11 to 30 C atoms.

Examples of odorless aldehydes of the formula (VIII) are esterification products of the aforementioned 2,2-disubstituted 3-hydroxy aldehydes with carboxylic acids such as, for example, lauric acid, tridecanoic acid, myristic acid, pentadecanoic acid, palmitic acid, margaric acid, stearic acid, nonadecanoic acid, arachidic acid, palmitoleic acid, oleic acid, erucic acid, linoleic acid, linolenic acid, eleostearic acid, arachidonic acid, fatty acids from the industrial saponification of natural oils and fats, such as, for example, rapeseed oil, sunflower oil, linseed oil, olive oil, coconut oil, oil palm kernel oil, and oil palm oil, and also technical mixtures of fatty acids which comprise these acids. Preferred aldehydes of the formula (VIII) are 2,2-dimethyl-3-lauroyloxypropanal, 2,2-dimethyl-3-myristoyloxypropanal, 2,2-dimethyl-3-palmitoyloxypropanal, and 2,2-dimethyl-3-stearoyloxypropanal. Particular preference is given to 2,2-dimethyl-3-lauroyloxypropanal.

Secondly suitable for preparing an aldimine D of the formula (IV a) or (IV b) are aldehydes of the formula (VI b)

where $Y^4$
alternatively is a substituted or unsubstituted aryl or heteroaryl group which has a ring size of between 5 and 8, preferably 6, atoms,
or is

where $R^6$ is a hydrogen atom or an alkoxy group,
or is a substituted or unsubstituted alkenyl or arylalkenyl group having at least 6 C atoms.

Suitable aldehydes of the formula (VI b) are aromatic aldehydes, such as, for example, benzaldehyde, 2- and 3- and 4-tolualdehyde, 4-ethyl- and 4-propyl- and 4-isopropyl- and 4-butyl-benzaldehyde, 2,4-dimethylbenzaldehyde, 2,4,5-trimethylbenzaldehyde, 4-acetoxybenzaldehyde, 4-anisaldehyde, 4-ethoxybenzaldehyde, the isomeric di- and trialkoxybenzaldehydes, 2-, 3-, and 4-nitrobenzaldehyde, 2- and 3- and 4-formylpyridine, 2-furfuraldehyde, 2-thiophenecarbaldehyde, 1- and 2-naphthylaldehyde, 3- and 4-phenyloxybenzaldehyde; quinoline-2-carbaldehyde and its 3-, 4-, 5-, 6-, 7- and 8-position isomers, and also anthracene-9-carbaldehyde.

Suitable aldehydes of the formula (VI b) are additionally glyoxal, glyoxalic esters, such as methyl glyoxalate, for example, and cinnamaldehyde and substituted cinnamaldehydes.

The polyurethane polymers A of the formula (I a) with aliphatic aldimine groups, and the polyurethane polymers A of the formula (I b) with aromatic aldimine groups, have the feature that their aldimine groups cannot undergo tautomerization to form enamine groups, since they contain no hydrogen as substituents in α position to the C atom of the aldimine group. On account of this feature, together with polyurethane polymers P1 containing isocyanate groups, they form mixtures which have particularly good storage properties, in other words are largely stable in their viscosity, even in the presence of highly reactive aromatic isocyanate groups such as those of TDI and MDI.

In the moisture-curing composition, the aldimine groups of the polyurethane polymer A are present in a greatly substoichiometric ratio in relation to the isocyanate groups of the polyurethane polymer P1. Typically the ratio between aldimine groups and isocyanate groups is 0.01 to 0.4, more particularly 0.03 to 0.3.

Customarily the polyurethane polymer A is present in an amount of 0.3%-20% by weight, preferably in an amount of 0.5%-15% by weight, more preferably in an amount from 1% to 10% by weight, based on the overall composition.

The moisture-curing composition advantageously further comprises at least one filler F. The filler F influences, for example, both the consistency of the uncured composition and the mechanical properties of the cured composition. Suitable fillers F are organic and inorganic fillers, examples being natural, ground or precipitated calcium carbonates, with a coating, optionally, of fatty acids, more particularly stearates; calcined kaolins, aluminum oxides, aluminum hydroxides, barytes ($BaSO_4$, also called heavy spar), silicas, especially highly disperse silicas from pyrolysis processes, carbon blacks, especially industrially produced carbon blacks (referred to below as "carbon black"), PVC powders or hollow spheres. Preferred fillers are calcium carbonates, kaolins, fumed silicas, and carbon black.

It may be of advantage to use a mixture of different fillers F.

A suitable amount of filler F is, for example, in the range from 10% to 70% by weight, preferably 20% to 60% by weight, based on the overall composition.

The composition advantageously further comprises at least one catalyst K which accelerates the reaction of the isocyanate groups and/or the hydrolysis of the aldimine groups.

Catalysts K which accelerate the reaction of the isocyanate groups with water are, in particular, metal compounds, examples being tin compounds such as dibutyltin diacetate, dibutyltin dilaurate, dibutyltin distearate, dibutyltin diacetylacetonate, dioctyltin dilaurate, dibutyltin dichloride, and dibutyltin oxide, tin(II) carboxylates, stannoxanes such as laurylstannoxane, bismuth compounds such as bismuth(III) octoate, bismuth(III) neodecanoate or bismuth(III) oxinates; and also tertiary amines, examples being 2,2'-dimorpholinodiethyl ether and other morpholine ether derivatives, 1,4-diazabicyclo[2.2.2]-octane, and 1,8-diazabicyclo[5.4.0]undec-7-ene.

Catalysts K which accelerate the hydrolysis of aldimine groups are, in particular, acids or compounds which can be hydrolyzed to acids, examples being organic carboxylic acids such as benzoic acid, salicylic acid or 2-nitrobenzoic acid, organic carboxylic anhydrides such as phthalic anhydride or hexahydrophthalic anhydride, silyl esters of organic carboxylic acids, organic sulfonic acids such as methanesulfonic acid, p-toluenesulfonic acid or 4-dodecylbenzenesulfonic acid, or other organic or inorganic acids.

There may also be combinations of the stated catalysts K present, especially mixtures of acids and metal compounds, or of metal compounds and tertiary amines, or of acids and tertiary amines, or of acids and metal compounds and tertiary amines.

A typical amount of catalyst K is customarily 0.005% to 1% by weight, based on the overall composition, it being clear to the person skilled in the art what quantities are sensible for which catalysts.

In the moisture-curing composition there may be further constituents present including, among others, the following auxiliaries and additives:

plasticizers, examples being esters of organic carboxylic acids or their anhydrides, for example, phthalates such as dioctyl phthalate, diisononyl phthalate or diisodecyl phthalate, adipates such as dioctyl adipate, azelates and sebacates; organic phosphoric and sulfonic esters, and polybutenes;

solvents;

fibers, of polyethylene, for example;

pigments, for example, titanium dioxide or iron oxides;

further catalysts customary in polyurethane chemistry;

rheology modifiers such as, for example, thickeners or thixotropic agents, examples being urea compounds, polyamide waxes, bentonites or fumed silicas;

reactive diluents or crosslinkers, examples being oligomers or polymers of diisocyanates such as MDI, PMDI, TDI, HDI, 1,12-dodecamethylene diisocyanate, cyclohexane 1,3- or 1,4-diisocyanate, IPDI, perhydro-2,4'- and -4,4'-diphenylmethane diisocyanate ($H_{12}MDI$), 1,3- and 1,4-tetramethylxylylene diisocyanate, more particularly isocyanurates, carbodiimides, uretonimines, biurets, allophanates, and iminooxadiazinediones of the stated diisocyanates, adducts of diisocyanates with short-chain polyols, adipic dihydrazide and other dihydrazides, and also blocked curing agents in the form of polyaldimines, polyketimines, oxazolidines or polyoxazolidines;

dryers, such as, for example, molecular sieves, calcium oxide, highly reactive isocyanates such as p-tosyl isocyanate, orthoformic esters, alkoxysilanes such as tetraethoxysilane, organoalkoxysilanes such as vinyltrimethoxysilane, and organoalkoxysilanes which have a functional group in α position to the silane group;

adhesion promoters, especially organoalkoxysilanes, referred to below as "silanes", such as, for example, epoxysilanes, vinylsilanes, (meth)acrylosilanes, isocyanatosilanes, carbamatosilanes, S-(alkylcarbonyl)-mercaptosilanes, and aldiminosilanes, and also oligomeric forms of these silanes;

stabilizers against heat, light and UV radiation;

flame retardants;

surface-active substances such as, for example, wetting agents, flow control agents, deaerating agents or defoamers;

biocides, such as algicides, fungicides or fungal growth inhibitors, for example;

and also further substances customarily employed in one-component polyurethane compositions.

The moisture-curing composition advantageously comprises at least one plasticizer.

It is advantageous to select all of the stated constituents optionally present in the composition, more particularly a filler F, a catalyst K, and a plasticizer, in such a way that the storage stability of the composition is not adversely affected by the presence of such a constituent; in other words, such that the composition suffers little or no change in its properties in the course of storage, especially in its application and curing properties. This means that reactions leading to the chemical curing of the composition described, more particularly of the isocyanate groups, do not occur to any significant extent in the course of storage. It is particularly important, therefore, that the stated constituents do not contain, or release on storage, any water, or only traces of water at the most. It may be sensible to carry out chemical or physical drying of certain constituents before they are incorporated into the composition.

To prepare the above-described composition, the polyurethane polymer A, preferably in the liquid state, is mixed with the polyurethane polymer P1 and any further constituents of the composition.

The moisture-curing composition described is prepared and stored in the absence of moisture. The composition is storage-stable—that is, under moisture-free conditions, it can be kept in a suitable pack or facility, such as a drum, a pouch or a cartridge, for example, over a period ranging from several months up to a year or more, without suffering, to any service-relevant extent, any change in its performance properties or in its properties after curing. Customarily the storage stability is determined via measurement of the viscosity or extrusion force.

When the moisture-curing composition is brought into contact with moisture, it begins to cure, by chemical reactions of the aldimine groups and of the isocyanate groups, and so to acquire its ultimate strength. The aldimine groups of the polyurethane polymer A have the property of undergoing hydrolysis on contact with moisture. The free amino groups that are formally produced in this reaction undergo reaction with the isocyanate groups that are present in the moisture-curing composition, producing urea groups and releasing aldehydes of the formula (VI a) or (VI b). The isocyanate groups of the composition that are in excess in relation to the aldimine groups react directly with moisture and form urea groups, eliminating carbon dioxide as they do so. As a result of these reactions, the composition cures; this process is also referred to as crosslinking. In the course of curing, with release of the aldehyde used in its preparation, the polyurethane polymer A is incorporated into the cured polyurethane matrix. The reaction of the isocyanate groups with the hydrolyzing polyurethane polymer A here need not necessarily take place by way of free amino groups. It will be appreciated that reactions of intermediates that occur in the course of the hydrolysis are also possible. For example, it is conceivable for a hydrolyzing aldimine group of the polyurethane polymer A to react, in the form of a hemiaminal group, directly with an isocyanate group.

Either the water that is needed for curing may come from the air (atmospheric moisture), or else the composition described above may be contacted with a water-containing component, by being spread-coated, for example with a smoothing agent, or by being sprayed, or else the composition during application can have a water-containing component added to it, in the form, for example, of a hydrous paste, which is mixed in via a static mixer, for example. In the case of curing by means of atmospheric moisture, the composition cures from outside to inside. The rate of curing is in this case determined by a variety of factors, such as the diffusion rate of the water, the temperature, the ambient humidity, and the adhesive-bonding geometry, for example; generally speaking, it slows down as curing progresses.

Where only odorless aldehydes, such as those described above, are released in the course of the curing of the moisture-curing composition, the curing of the composition does not produce any nuisance odor, something which for many applications, particularly in interiors, is a great advantage or even a prerequisite.

Where the above-described composition is applied warm, in other words at a temperature above the melting point of the polyurethane polymer A, curing takes place by means of two processes. First, the composition solidifies on cooling, by the polyurethane polymer A solidifying, in particular through crystallization, and so sharply increasing the viscosity of the composition. This physical curing ends the open time at a certain point in time, and results in the initial strength of the composition. In parallel, the composition cures chemically by means of moisture, associated with the development of the ultimate strength, as described above.

In the fully cured state, the above-described composition possesses elastic properties in conjunction with a high strength. This means that on the one hand it has a high extensibility, typically >300%, a high modulus of elasticity, typically >5 MPa in the range of 0.5%-5% extension, and a high tensile strength, typically >6 MPa. On the basis of these properties the composition is suitable for a multiplicity of applications, especially as an elastic adhesive. In particular it is suitable for applications which require a good initial strength.

The above-described composition is used preferably as an adhesive, more particularly as a warmmelt adhesive.

Suitable applications are, for example, the adhesive bonding of components in construction or civil engineering, and in the manufacture or repair of industrial goods or consumer goods, more particularly of windows, household appliances or means of transport such as water or land vehicles, preferably automobiles, buses, trucks, trains or ships; or the sealing of joints, seams or cavities in industrial manufacture or repair, or in construction or civil engineering.

In its application as an adhesive, the moisture-curing composition is used for adhesively bonding a substrate S1 and a substrate S2.

An adhesive bonding method of this kind comprises the steps of
 i') applying the above-described composition to the substrate S1;
 ii') contacting the applied composition with the substrate S2 within the open time;
 iii') chemically crosslinking the composition with moisture;
 the substrate S2 being composed of the same or a different material from the substrate S1.

With particular preference the composition described is used as a warmmelt adhesive, which is applied warm.

In its application as a warmmelt adhesive, the above-described composition is used for adhesively bonding a substrate S1 and a substrate S2.

An adhesive bonding method of this kind comprises the steps of
 i) heating the composition to a temperature above the melting point of the polyurethane polymer A of the formula (I a) or (I b), more particularly between 40° C. and 100° C.;
 ii) applying the heated composition to the substrate S1;
 iii) contacting the applied composition with the substrate S2 within the open time.

Optionally, step iii) may be followed by a step iv) of displacing the substrate S1 relative to the substrate S2.

Step iii), or optionally step iv), is followed by a step v) of chemically curing the composition with moisture. The person skilled in the art understands that the curing reaction, as a function of factors such as the composition used, the substrates, the temperature, the ambient humidity and the adhesive-bonding geometry, may even begin during the adhesive bonding procedure. The major part of the chemical curing, however, generally takes place after the joining operation.

The substrate S1 may be the same as or different from substrate S2.

Suitable substrates S1 or S2 are, for example, inorganic substrates such as glass, glass ceramic, concrete, mortar, brick, tile, plaster and natural stones such as granite or marble; metals or alloys such as aluminum, steel, nonferrous metals, galvanized metals; organic substrates such as wood, plastics such as PVC, polycarbonates, PMMA, polyethylene, polypropylene, polyesters, epoxy resins; coated substrates such as powder-coated metals or alloys; and also paints and finishes, especially automobile topcoats.

Preferably one of the substrates, S1 or S2, is a glass or a glass ceramic, more particularly in the form of a glazing sheet. With particular preference one of the substrates, S1 or S2, is a vehicle glazing sheet, more particularly an automobile glazing sheet.

Where necessary, the substrates S1 and/or S2 may be pretreated before the above-described composition is applied. Such pretreatments include, in particular, physical and/or chemical cleaning techniques, examples being abrading, sandblasting, brushing or the like, or treatment with cleaners or solvents; or the application of an adhesion promoter, an adhesion-promoter solution or a primer; or a flame or plasma treatment, more particularly an air-plasma pretreatment at atmospheric ambient pressure.

Adhesive bonding of the substrates S1 and S2 by means of the above-described composition produces an adhesively bonded article. An article of this kind may be a built structure, more particularly a built structure in construction or civil engineering, or it may be an industrial good or a consumer product such as, for example, a window, a household appliance or a means of transport, such as a water or land vehicle, for example, more particularly an automobile, a bus, a truck, a train or a ship, or a component for installation therein or thereon.

For application of the above-described composition as an adhesive for elastic bonds, such as in vehicle construction, for example, the composition at the application temperature preferably has a pastelike consistency with properties of structural viscosity. A pastelike adhesive of this kind is applied to the substrate by means of a suitable apparatus. Suitable methods of application are, for example, application from commercially customary cartridges, which are operated manually or by means of compressed air, or from a drum or hobbock by means of a conveying pump or an extruder, optionally by means of an application robot. For application of the composition as an adhesive for elastic bonds, such as in vehicle construction, for example, which require a good initial strength, the adhesive is heated to the required application temperature, to 40° C. to 100° C., for example, prior to the application, by means of a suitable method, as, for example, by means of sufficient storage of the respective adhesive in the pack at the corresponding temperature, and/or through the use of a heatable container, and/or through the conveying of the adhesive through a heatable application apparatus. In that case the adhesive at the application temperature preferably has a pastelike consistency with not too high a viscosity, while the consistency at room temperature is significantly firmer to solid, depending on the initial-strength requirements.

An adhesive on application preferably features sag resistance and short stringing. That is, it remains in the applied form following application, in other words does not run apart, and, after the application device has been set down, the adhesive forms very short strings, if any at all, so that the substrate and the application device are, as far as is possible, not fouled.

Where the above-described composition is used as an adhesive for elastic bonds, such as in vehicle construction, for example, the composition is applied preferably in the form of a bead having a substantially circular or triangular cross-sectional area.

Elastic bonds in vehicle construction, for example, include, for example, the adhesive attachment of parts, such as plastic covers, trim strips, flanges, bumpers, driver's cabs or other components for installation, on a vehicle, or the bonding of glazing sheets into a vehicle. Vehicles shall include, for example, automobiles, trucks, buses, rail vehicles, and ships.

The above-described composition is preferably used for the bonding of glazing sheets into a vehicle, more particularly into an automobile.

The composition described above is applied preferably at an elevated temperature, more particularly at 40° C. to 100° C. Alternatively, depending on the nature and amount of the melting component in the form of a polyurethane polymer A, it may also be applied at room temperature or below. Depending on the nature of the composition, therefore, it is not absolutely necessary for the melting component to be melted for the application of the composition.

One preferred application of the above-described composition is that of adhesives having a good initial strength. An adhesive of this kind exhibits a consistency at room temperature which is highly pastelike to solid. For application, it is heated to a temperature of, for example, 40° C. to 100° C., with the consistency, owing primarily to the melting of the polyurethane polymer A, changing in such a way as to produce a pastelike material of low viscosity. Following the application of the adhesive, it cools to ambient temperature, more particularly room temperature, and the melting component in the form of the polyurethane polymer A gradually becomes solid. By virtue of this solidification process, the adhesive has a significantly increased viscosity and, as a result, a good initial strength at a point in time at which the chemical curing by means of moisture has not yet substantially advanced.

The open time of an adhesive of this kind is dependent on the rate at which the viscosity of the adhesive goes up on cooling. The higher the viscosity of the adhesive, the greater the force that must be expended in order to press an adherend onto the adhesive in such a way as to produce a suitable bond. One measure of the end of the open time, therefore, is the pressing force at the particular point in time after application. The level the maximum pressing force may reach is dependent on factors which include the respective manufacturing operation. In the case of manual bonding, the open time is shorter than in the case of bonding by means of a robot, which, generally speaking, applies substantially more force for the pressing insertion of an adherend.

The level of the initial strength is dependent on the consistency of the adhesive after the melting component has solidified, in the course of cooling. The requirements relating to the level of the initial strength are heavily dependent on the specific manufacturing operation. Typically, for example, a glazing sheet bonded into a vehicle body is to be held, without mechanical fixing, by the initial strength of the adhesive. In other words, the entire bead of adhesive is to bear the intrinsic weight of the glazing sheet on the basis of the initial strength, without the chemical curing of the adhesive having already begun to any notable extent by means of moisture. At this point in time it is typically still possible to displace the adherends slightly relative to one another and so to bring them into the position desired for the adhesive bond.

Of course, an adhesive having a short open time exhibits a higher initial strength than an adhesive having a longer open time.

In a further aspect, the invention provides a method of influencing the open time and initial strength of a polyurethane composition by means of a melting component, which constitutes a polyurethane polymer P2 which contains isocyanate groups and is of the formula (III), characterized in that the polyurethane polymer P2 of the formula (III), containing isocyanate groups, is reacted partly or fully with an aldimine D of the formula (IV a) or (IV b)

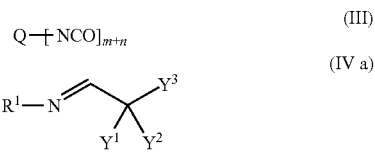

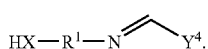  (IV b)

The substituents Q, $Y^1$, $Y^2$, $Y^3$, $Y^4$, $R^1$, and X, and the indices m and n, are those of the solid polyurethane polymer A, containing aldimine groups, of the formula (I a) or (I b) in the one-component moisture-curing composition as described above.

The room-temperature solid polyurethane polymer P2 of the formula (III), containing isocyanate groups, has a melting point in the range from 40° C. to 80° C., more particularly in the range from 50° C. to 70° C.

The reaction of the melting component, containing isocyanate groups, in the form of the polyurethane polymer P2 of the formula (III) with an aldimine D of the formula (IV a) or (IV b) is carried out advantageously at a temperature at which the melting component is present in the liquid state, optionally with accompanying use of suitable catalysts, the aldimine D being metered stoichiometrically, slightly superstoichiometrically, or substoichiometrically, preferably stoichiometrically or slightly superstoichiometrically, in relation to the isocyanate groups of the melting component.

Melting components prepared from such reactions and containing aldimine groups, as a constituent of a warmmelt adhesive composition, lead to a change in curing characteristics as compared with the unreacted melting components containing isocyanate groups. In particular a prolonged open time is obtained. The polyurethane polymers A obtained from the reactions of polyurethane polymers P2 with aldimines D, and more particularly the polyurethane polymers A1 or A2, change the curing characteristics of a warmmelt adhesive composition in a particularly advantageous way, in that the solidification of the melting component, which takes place in particular as a result of crystallization, occurs with a slight to pronounced delay. As a result, warmmelt adhesive compositions are obtainable which have a melting behavior comparable with the prior art but have a longer open time. The prolonged open time can be varied within a broad range through the nature and amount of the aldimine D used for the reaction of the polyurethane polymer P2, and this is a great advantage for the use of such a composition as an adhesive, especially in industrial manufacturing operations.

The open time can be controlled in particular through the choice of the aldimine D and the stoichiometry of the reaction. Where aldimines D are used in which X in formula (IV a) or (IV b) is O or N—$R^2$, where $R^2$ is an alkyl group having 1 to 4 C atoms, more particularly methyl, the warmmelt adhesive has a relatively short open time and a high initial strength. Where aldimines D are used in which X in formula (IV a) or (IV b) is N—$R^2$, where $R^2$ is either a monovalent hydrocarbon radical having more than 4 C atoms which optionally contains at least one carboxylic ester, nitrile, nitro, phosphonic ester, sulfonyl or sulfonic ester group, or is a substituent of the formula (II a) or (II b); or in which X in formula (IV a) or (IV b) is N—$R^{2'}$, where $R^{2'}$ has the definition already stated in formula (I a) or (I b), the warmmelt adhesive has a longer open time.

Accordingly the method enables access to warmmelt adhesive compositions for which the open time and the initial strength can be adjusted within a wide range, something which is a great advantage for numerous adhesive-bonding operations.

In a further aspect, finally, the invention provides a room-temperature solid polyurethane polymer A2 of the formula (I a') or (I b'), containing aldimine groups, which has a melting point in the range from 40° C. to 80° C.,

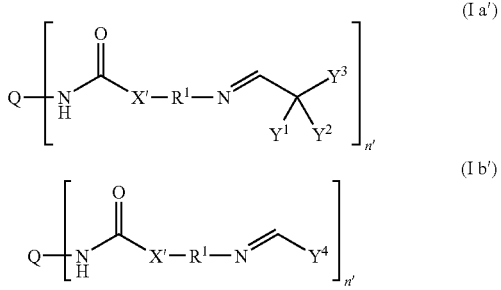

where in formula (I a') and (I b')
n' is 2 or 3, more particularly 2;
Q is the radical of a polyurethane polymer P2, which is solid at room temperature and has a melting point in the range from 40° C. to 80° C., after removal of n' isocyanate groups;
$Y^1$ and $Y^2$ independently of one another either are each a monovalent hydrocarbon radical having 1 to 12 C atoms, or together are a divalent hydrocarbon radical having 4 to 20 C atoms which is part of an unsubstituted or substituted carbocyclic ring having 5 to 8, preferably 6, C atoms;
$Y^3$ is a monovalent hydrocarbon radical which optionally contains at least one heteroatom, more particularly oxygen in the form of ether, carbonyl or ester groups;
$Y^4$ alternatively
  is a substituted or unsubstituted aryl or heteroaryl group which has a ring size of between 5 and 8, preferably 6, atoms,
  or is

where $R^6$ is a hydrogen atom or is an alkoxy group,
  or is a substituted or unsubstituted alkenyl or arylalkenyl group having at least 6 C atoms;
$R^1$ either is a divalent hydrocarbon radical having 2 to 12 C atoms which optionally contains at least one heteroatom, more particularly in the form of ether oxygen or tertiary amine nitrogen, or, if X' is N—$R^{2'}$, is together with $R^{2'}$ a trivalent hydrocarbon radical having 4 to 12 C atoms which optionally contains at least one heteroatom, more particularly in the form of ether oxygen or tertiary amine nitrogen;
X' is O or is N—$R^2$ or is N—$R^{2'}$;
and where
  $R^2$ either
  is an alkyl group having 1 to 4 C atoms, more particularly methyl,
  or is —$CHR^7$—$CH_2R^8$, where
    $R^7$ is a hydrogen atom or is —$COOR^9$ and
    $R^8$ is —$COOR^9$ or —$CONHR^9$ or —$CONR^9{}_2$, where
      $R^9$ is an alkyl group having 1 to 4 C atoms; and $R^{2'}$ together with $R^1$ is a trivalent hydrocarbon radical having 4 to 12 C atoms which optionally contains at least one heteroatom, more particularly in the form of ether oxygen or tertiary amine nitrogen.
Preferably the polyurethane polymer P2 is prepared from at least one room-temperature liquid, amorphous, partly crystalline or crystalline polyesterdiol or polycarbonatediol, and from a polyisocyanate, the room-temperature liquid polyesterdiol or polycarbonatediol being solid at a temperature between 0° C. and 25° C., and being used always in combination with at least one amorphous, partly crystalline or crystalline polyesterpolyol and/or polycarbonatepolyol.

The polyurethane polymer A2 of the formula (I a') or (I b') preferably possesses a melting point in the range from 50° C. to 70° C.

The polyurethane polymer A2 of the formula (I a') or (I b') is prepared in particular from a room-temperature solid polyurethane polymer P2 of the formula (III') and from an aldimine D of the formula (IV a') or (IV b')

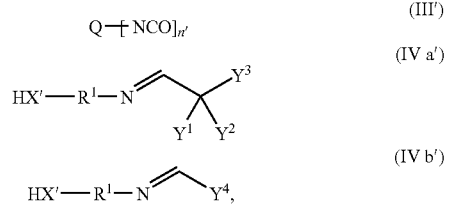

which is prepared in turn from an amine of the formula (V') and an aldehyde of the formula (VI a) or (VI b)

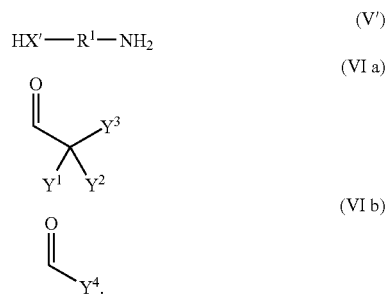

The substituents Q, $Y^1$, $Y^2$, $Y^3$, $Y^4$, $R^1$, and X', and the index n', have the same definition as stated in formula (I a') and formula (I b').

As amine of the formula (V') for preparing a polyurethane polymer A2 of the formula (I a') or (I b'), suitability is possessed more particularly by amines which are selected from the group consisting of N-methyl-1,2-ethanediamine, N-ethyl-1,2-ethanediamine, N-methyl-1,3-propanediamine, N-ethyl-1,3-propanediamine, N-butyl-1,3-propanediamine, 4-aminomethylpiperidine, 3-(4-aminobutyl)piperidine, and also products of the Michael-like addition of aliphatic primary diamines with maleic and fumaric diesters, acrylic and methacrylic esters, acrylamides and methacrylamides, preferably with maleic diesters, more particularly dimethyl, diethyl, dipropyl, and dibutyl maleate, and with acrylic esters, more particularly methyl acrylate, reacted in a molar ratio of 1:1; aliphatic hydroxy amines in which the primary amino group are separated from the hydroxyl group by a chain of at least five atoms, or by a ring, more particularly 5-amino-1-pentanol, 6-amino-1-hexanol, and higher homologs thereof, 4-(2-aminoethyl)-2-hydroxyethylbenzene, 3-aminomethyl-3,5,5-trimethylcyclohexanol, 2-(2-aminoethoxy)ethanol, triethylene glycol-monoamine and higher oligomers and polymers thereof, 3-(2-hydroxyethoxy)propylamine, 3-(2-(2-hydroxyethoxy)ethoxy)propylamine, and 3-(6-hydroxyhexyloxy)propylamine.

A particular feature of the polyurethane polymer A2 of the formula (I a') or (I b') is that it is storage-stable at an elevated temperature, more particularly above its melting point, and hence can be stored in the liquid state for a relatively long time without suffering significant change in its viscosity, melting, and solidifying properties. It is suitable more particularly as a melting component in adhesives, sealants, floorings or coatings, especially for one-component, moisture-curing polyurethane compositions. Furthermore, it is suitable as a thickener or thixotropic agent for adhesives, sealants, floorings or coatings which are applied at temperatures below the melting point of the polyurethane polymer A2, containing aldimine groups, of the formula (I a') or (I b'), more particularly below 40° C., preferably at temperatures between 0 and 35° C., especially for one-component, moisture-curing polyurethane compositions.

The capacity of a melting component or thickener or a thixotropic agent to be stored in the liquid state is of considerable practical significance, since in the liquid form it is easy to meter and need not first be melted for preparing a composition, an operation which entails cost and inconvenience in the case of a batch preparation procedure. Moreover, good storage stability of a melting component or thickener or thixotropic agent for use in a composition, especially a polyurethane composition which is employed more particularly as a warmmelt adhesive with good initial strength, is important since it means that the composition suffers little or no change on storage, even at elevated temperature, in its application and curing properties, and, in particular, produces largely constant values for open time and for initial strength that depend little on production date and storage conditions.

EXAMPLES

Description of the Test Methods

The total amount of aldimino groups and free amino groups in the compounds prepared ("amine content") was determined by titrimetry (with 0.1N $HClO_4$ in glacial acetic acid, against crystal violet) and is always reported in mmol $NH_2/g$ (even when there are not only primary amino groups).

The viscosity was measured on a thermostated cone/plate viscometer, Physica UM (cone diameter 20 mm, cone angle 1°, cone tip/plate distance 0.05 mm, shear rate 10 to 1000 $s^{-1}$).

The melting point and the crystallization point were determined by means of DSC, each sample being first heated from 0° C. to 100° C. at a heating rate of 2° C./min, and then cooled from 100° C. back down to 0° C. at a cooling rate of 2° C./min. The melting point read off in each case was the endothermic maximum of the heating curve, the crystallization point the exothermic maximum of the cooling curve. To determine the crystallization point, measurements were carried out additionally with a higher cooling rate of 5° C. or 10° C./min, in order to test the solidification behavior on more rapid cooling.

The open time was determined as follows: The adhesive was applied at 60° C. to a number of polypropylene plaques, application taking place in each case in the form of a triangular bead with a width of about 1 cm. At regular intervals of time, each plaque was covered with a second polypropylene plaque, which was immediately pressed to an adhesion thickness of 5 mm, and labeled with the time that elapsed between bead application and pressing insertion of the plaque. The force needed for pressing was recorded. The open time was taken to be the point in time at which the pressing force exceeded a level of 8 N/cm. (In an industrial manufacturing operation, such as the bonding of a glazing sheet in an automobile, a level of around 8 N/cm represents the limit of the allowable pressing force for a robot, as is typically employed.)

The initial strength was determined as follows: a bead of adhesive was applied, with a triangular cross-sectional area, in a length of 100 mm, a width of 10 mm, and a height of 12 mm, at 60° C., in the horizontal direction, to a vertical surface. After a waiting time of 30 seconds, a glass plate of dimensions of 100×40×12 mm was pressed onto the bead of adhesive to an extent such that the layer of adhesive had a thickness of 5 mm, the glass plate being positioned such that its surface was vertical and the adhesive lay along the upper long edge. The glass plate was held in position for 30 seconds and then released. Two minutes after the release, a measurement was made of the distance by which the glass plate had moved downward under its inherent weight. The load exerted on the bond by the inherent weight of the glass plate was 3 g/cm. A downward displacement of the glass plate of up to 0.5 mm was termed "very good", while a displacement of >0.5 mm up to 3 mm was termed as "good".

The tensile strength, the elongation at break and the modulus of elasticity were determined in accordance with DIN 53504 (pulling speed: 200 mm/min) on films 2 mm thick which had been cured for 14 days under standard conditions (23±1° C., 50±5% relative humidity).

The adhesion of the adhesives was determined on small glass plates which before use had been pretreated with Sika® Aktivator (available from Sika Schweiz AG) and allowed to air for 10 minutes. Each adhesive was applied at a temperature of 60° C., in the form of a bead, to the glass surface thus treated, and was tested after two weeks of storage at 23° C. and 50% relative humidity. For the purpose of testing, an incision was made into one end of the bead of adhesive down to just above the surface of the glass. The incised end of the bead was held by hand and then pulled carefully and slowly from the glass surface with a peeling action in the direction of the other end of the bead. If, in the course of this removal procedure, the adhesion was so strong that the end of the bead threatened to tear off when being pulled, a cutter was used to apply a cut perpendicular to the bead-pulling direction, down to the bare surface of the glass, and in this way a section of bead was detached. Cuts of this kind were repeated, if necessary, in the course of continued pulling, at intervals of 2 to 3 mm. In this way the entire bead was pulled and/or cut from the paint surface. The adhesion was evaluated on the basis of the cured adhesive that remained on the glass surface after the bead had been removed (cohesive fracture), specifically through estimation of the cohesive component of the adhesion area. Where the cohesive component was >95% of the adhesion area, the adhesion was termed as "very good".

To determine the sag resistance, the adhesive was applied using a cartridge gun via a triangular nozzle as a horizontally extending triangular bead having a base diameter of 8 mm and a height (distance of the tip of the triangle from the base) of 20 mm, to a vertical piece of cardboard. After 5 minutes, a measurement was made of the extent to which the peak had lowered, i.e., had moved away from the original position in the middle of the triangular bead. Evaluation: 1=peak unchanged; 2=peak between middle and end of base; 3=peak at level of end of base; 4=peak lower than end of base; 5=no peak present.

The stringing was determined qualitatively by applying a little adhesive, using a cartridge gun, to a piece of cardboard fastened to the wall, pulling the cartridge gun away at the end of application, by rapid withdrawal from the applied adhesive, and measuring the length of the string of adhesive that remained at the pull-away site in this operation. For evaluation, the following yardstick was applied: Stringing short=string length up to 1 cm; medium=string length up to 2 cm; long=string length greater than 2 cm.

a) Preparation of Aldimines D

Aldimine D1

A round-bottom flask was charged under a nitrogen atmosphere with 28.06 g (0.099 mol) of 2,2-dimethyl-3-lauroyloxypropanal. With vigorous stirring, 10.00 g (0.095 mol) of 2-(2-aminoethoxy)ethanol (Diglycolamine® agent; Huntsman) were added over the course of 3 minutes from a dropping funnel, the temperature of the reaction mixture climbing to 40° C. Thereafter the volatiles were removed under reduced pressure (10 mbar, 80° C.). This gave 36.3 g of a colorless, clear, and odorless liquid which was of low viscosity at room temperature and had an amine content of 2.58 mmol $NH_2$/g.

Aldimine D2

A round-bottom flask was charged under a nitrogen atmosphere with 30.13 g (0.106 mol) of 2,2-dimethyl-3-lauroyloxypropanal. With vigorous stirring, 15.00 g (0.096 mol) of N-cyclohexyl-1,3-propanediamine were added over the course of 5 minutes from a dropping funnel, the temperature of the reaction mixture climbing to 36° C. Thereafter the volatiles were removed under reduced pressure (10 mbar, 80° C.). This gave 43.2 g of a colorless, clear, and odorless liquid which was of low viscosity at room temperature and had an amine content of 4.39 mmol $NH_2$/g.

Aldimine D3

A round-bottom flask was charged under a nitrogen atmosphere with 40.64 g (0.143 mol) of 2,2-dimethyl-3-lauroyloxypropanal. With vigorous stirring, 11.68 g (0.133 mol) of N-methyl-1,3-propanediamine were added over the course of 5 minutes from a dropping funnel, the temperature of the reaction mixture climbing to 38° C. Thereafter the volatiles were removed under reduced pressure (10 mbar, 80° C.). This gave 49.8 g of a colorless, clear, and odorless liquid which was of low viscosity at room temperature and had an amine content of 5.20 mmol $NH_2$/g.

Aldimine D4

A round-bottom flask was charged under a nitrogen atmosphere with 34.15 g (0.120 mol) of 2,2-dimethyl-3-lauroyloxypropanal. With vigorous stirring, 12.02 g (0.056 mol) of bishexamethylenetriamine (BHMT-HP; Invista) were added over the course of 5 minutes from a dropping funnel, the temperature of the reaction mixture climbing to 35° C. Thereafter the volatiles were removed under reduced pressure (10 mbar, 80° C.). This gave 43.6 g of a colorless, clear, and odorless liquid which was of low viscosity at room temperature and had an amine content of 3.68 mmol $NH_2$/g.

Aldimine D5

A round-bottom flask was charged under a nitrogen atmosphere with 27.02 g (0.254 mol) of 2-(2-aminoethoxy)ethanol (Diglycolamine® agent; Huntsman). With vigorous stirring, 27.72 g (0.262 mol) of benzaldehyde were added over the course of 5 minutes from a dropping funnel, the temperature of the reaction mixture climbing to 35° C. Thereafter the volatiles were removed under reduced pressure (10 mbar, 80° C.). This gave 50.0 g of a yellowish and clear liquid which was of low viscosity at room temperature and had an amine content of 5.13 mmol $NH_2$/g.

b) Preparation of Polyurethane Polymers P2

Polymer P2.1

1000 g of polyol Dynacoll® 7360 (polyesterdiol, OH number 30 mg KOH/g, water content 0.05% by weight, melting point 55° C.; Degussa) and 139.8 g of 4,4'-methylenediphenyl diisocyanate (MDI; Desmodur® 44 MC L, Bayer) were reacted by a known method at 80° C. to give an NCO-terminated polyurethane polymer. The reaction product had a free isocyanate group content, determined by titrimetry, of 1.9% by weight.

Polymer P2.2

1000 g of polyol Dynacoll® 7381 (polyesterdiol, OH number 30 mg KOH/g, water content 0.05% by weight, melting point 65° C.; Degussa) and 139.8 g of 4,4'-methylenediphenyl diisocyanate (MDI; Desmodur® 44 MC L, Bayer) were reacted by a known method at 80° C. to give an NCO-terminated polyurethane polymer. The reaction product had a free isocyanate group content, determined by titrimetry, of 1.9% by weight.

c) Preparation of Polyurethane Polymers A (Melting Components or Thickeners)

Polyurethane Polymer A1.1

At a temperature of 60° C., 300 g of polymer P2.1 were mixed homogeneously with 52.6 g of aldimine D1. The reaction product was stored in the absence of moisture. Its properties are set out in table 1.

Polyurethane Polymer A1.2

At a temperature of 60° C., 300 g of polymer P2.1 were mixed homogeneously with 61.8 g of aldimine D2. The reaction product was stored in the absence of moisture. Its properties are set out in table 1.

Polyurethane Polymer A1.3

At a temperature of 60° C., 300 g of polymer P2.2 were mixed homogeneously with 52.6 g of aldimine D1. The reaction product was stored in the absence of moisture. Its properties are set out in table 2.

Polyurethane Polymer A1.4

At a temperature of 60° C., 300 g of polymer P2.2 were mixed homogeneously with 52.2 g of aldimine D3. The reaction product was stored in the absence of moisture. Its properties are set out in table 2.

Polyurethane Polymer A1.5

At a temperature of 60° C., 300 g of polymer P2.2 were mixed homogeneously with 110.6 g of aldimine D4. The reaction product was stored in the absence of moisture. Its properties are set out in table 2.

Polyurethane Polymer A1.6

At a temperature of 60° C., 0.300 g of polymer P2.2 were mixed homogeneously with 26.5 g of aldimine D5. The reaction product was stored in the absence of moisture. Its properties are set out in table 2.

d) Properties of the Melting Components

Examples 1 to 8

The properties of polyurethane polymers A1.1, A1.2, A1.3, A1.4, A1.5, and A1.6 and also of polymers P2.1 and P2.2 were determined in respect of their suitability as melting components. They are set out in tables 1 and 2.

TABLE 1

Properties of the melting components of examples 1 and 2 (inventive) and of example 3 (comparative).

| | Example | | |
|---|---|---|---|
| | 1 | 2 | 3 (comparative) |
| Melting component | A1.1 | A1.2 | P2.1 |
| Viscosity at 70° C. | | | |
| fresh | 43 Pa·s | 44 Pa·s | 31 Pa·s |
| stored (7 days at 70° C.) | 44 Pa·s | 72 Pa·s | 62 Pa·s |
| relative increase | 2% | 64% | 100% |
| Melting point | 52.3° C. | 53.7° C. | 52.6° C. |
| Crystallization point | | | |
| cooling rate 2° C./minute | 31.5° C. | 31.0° C. | 37.6° C. |
| cooling rate 5° C./minute | 26.0° C. | 25.7° C. | 34.9° C. |
| cooling rate 10° C./minute | 21.3° C. | 20.7° C. | 30.7° C. |

TABLE 2

Properties of the melting components of examples 4, 5, 6, and 7 (inventive) and of example 8 (comparative).

| | Example | | | | |
|---|---|---|---|---|---|
| | 4 | 5 | 6 | 7 | 8 (comp.) |
| Melting component | A1.3 | A1.4 | A1.5 | A1.6 | P2.2 |
| Viscosity at 70° C. | | | | | |
| fresh | 44 Pa·s | 67 Pa·s | n.d. | n.d. | 49 Pa·s |
| stored (7 days at 70° C.) | 54 Pa·s | 79 Pa·s | n.d. | n.d. | 95 Pa·s |
| relative increase | 22% | 19% | | | 94% |
| Melting point | 61.2° C. | 62.7° C. | 57.3° C. | 62.5° C. | 59.3° C. |
| Crystallization point | | | | | |
| cooling rate 2° C./minute | 42.8° C. | 43.3° C. | 38.7° C. | 43.9° C. | 44.4° C. |
| cooling rate 5° C./minute | 39.6° C. | 39.9° C. | 33.6° C. | 40.3° C. | 42.3° C. |
| cooling rate 10° C./minute | 36.6° C. | 36.8° C. | 30.0° C. | 37.0° C. | 39.2° C. | n.d. = not determined

From tables 1 and 2 it is evident that the melting components of the invention, in the form of polyurethane polymers A1.1, A1.2, A1.3, and A1.4, when stored in the liquid state at a temperature of 70° C., exhibit a smaller increase in viscosity than the melting components in the form of the polymers P2.1 and P2.2. A particularly low increase in viscosity is shown by the inventive polyurethane polymers of examples 1, 4, and 5, which represent reaction products of aldimines D of the formula (IV a) or (IV b), or (IV a') or (IV b'), in which X, or X', is oxygen or N—CH$_3$.

From tables 1 and 2 it is further evident that the melting points of examples 1 and 2, and of examples 4, 5, 6 and 7, are very close to the melting points of example 3 (comparative), and of example 8 (comparative), respectively. Consequently, the melting behavior of the polymers P2.1 and P2.2 has not altered substantially as a result of the reaction with the aldimines D.

Finally, it emerges from tables 1 and 2 that the crystallization of the melting components of the invention, as compared with that of the melting components according to the comparative examples, which were not reacted with aldimines D, begins more slowly, or with a delay.

It emerges from tables 1 and 2, finally, that the crystallization points of examples 1 and 2, and 4, 5, 6, and 7, are significantly lower than those of examples 3 (comparative), and 8 (comparative). This becomes particularly clear when the DSC measurement is carried out with rapid cooling rates (5° C. or 10° C./minute). From this it can be inferred that the crystallization of the melting components of the invention, when they are used as part of an adhesive in a manufacturing operation at an application temperature of 40 to 80° C. and an ambient temperature of room temperature, begins more slowly, or with a delay, as compared with the melting components of the comparative examples.

e) Preparation of a Polyurethane Polymer P1

Polymer P1.1

1295 g of polyol Acclaim® 4200 N (low monol polyoxypropylenediol, OH number 28.5 mg KOH/g; Bayer), 2585 g of polyol Caradol® MD34-02 (polyoxypropylene-polyoxyethylenetriol, OH number 35.0 mg KOH/g; Shell), 620 g of 4,4'-methylenediphenyl diisocyanate (MDI; Desmodur® 44 MC L, Bayer), and 500 g of diisodecyl phthalate (DIDP; Palatinol® Z, BASF) were reacted by a known method at 80° C. to give an NCO-terminated polyurethane polymer. The reaction product had a free isocyanate group content, determined by titrimetry, of 2.03% by weight.

f) Preparation of a Urea Thickener Paste

In a vacuum mixer, 1000 g of diisodecyl phthalate (Palatinol® Z, BASF) and 160 g of 4,4'-methylenediphenyl diisocyanate (MDI; Desmodur® 44 MC L, Bayer) were introduced and slightly warmed. Then 90 g of monobutylamine were added slowly dropwise with vigorous stirring. The resulting white paste was stirred for a further hour under reduced pressure and with cooling, then cooled and subsequently put to further use.

g) Preparation of Adhesive Base Materials

Adhesive Base 1

In a vacuum mixer, 3650 g of polymer P1.1, 20 g of p-tolylsulfonyl isocyanate (additive TI®, Bayer), 1330 g of diisodecyl phthalate (DIDP; Palatinol® Z, BASF), 1000 g of urea thickener paste, 2000 g of carbon black, 1700 g of calcined kaolin, and 1.3 g of dibutyltin dilaurate were processed in the absence of moisture to a lump-free, homogeneous paste which was stored in the absence of moisture.

Adhesive Base 2

In a vacuum mixer, 2000 g of polymer P1.1, 20 g of p-tolylsulfonyl isocyanate (additive TI®, Bayer), 1000 g of diisodecyl phthalate (DIDP; Palatinol® Z, BASF), 900 g of carbon black, 900 g of calcined kaolin, 8 g of 2,2'-dimorpholinodiethyl ether and 0.4 g of dibutyltin dilaurate were processed in the absence of moisture to a lump-free, homogeneous paste which was stored in the absence of moisture.

h) Preparation of Adhesives

Examples 9 to 15

In accordance with the quantity figures in table 3, the respective melting component, in the form of a polyurethane polymer A for the inventive adhesives of examples 9, 10, 12, 13, and 14, or in the form of polyurethane polymer P2 for the adhesives of comparative examples 11 and 15, was incorporated homogeneously in the liquid state, in the absence of moisture, into adhesive base 1. The resulting adhesives were stored in cartridges at room temperature in the absence of moisture.

The properties of examples 9 to 15 are set out in table 4. The adhesives were applied at an ambient temperature of 25° C. and with an adhesive temperature of 60° C.

TABLE 3

Composition of the adhesives of inventive examples 9, 10, 12, 13, and 14 and of comparative examples 11 and 15, in parts by weight.

| | Example | | | | | | |
|---|---|---|---|---|---|---|---|
| | 9 | 10 | 11 (comp.) | 12 | 13 | 14 | 15 (comp.) |
| Adhesive base 1 | 97.0 | 97.0 | 97.0 | 97.0 | 97.0 | 97.0 | 97.0 |
| Polyurethane polymer A1.1 | 2.5 | — | — | — | — | — | — |
| Polyurethane polymer A1.2 | — | 2.6 | — | — | — | — | — |
| Polyurethane polymer A1.3 | — | — | — | 2.5 | — | — | — |
| Polyurethane polymer A1.4 | — | — | — | — | 2.4 | — | — |
| Polyurethane polymer A1.5 | — | — | — | — | — | 2.6 | — |
| Polymer P2.1 | — | — | 2.1 | — | — | — | — |
| Polymer P2.2 | — | — | — | — | — | — | 2.1 |

TABLE 4

Properties of the adhesives of inventive examples 9, 10, 12, 13, and 14 and of comparative examples 11 and 15.

| | Example | | | | | | |
|---|---|---|---|---|---|---|---|
| | 9 | 10 | 11 (comp.) | 12 | 13 | 14 | 15 (comp.) |
| Open time [min] | 37 | 45 | 17 | 10 | 8 | 28 | 4 |
| Initial strength | good | good | good | very good | very good | good | very good |
| Tensile strength [MPa] | 8.5 | 8.3 | 8.1 | 8.1 | 8.3 | 8.6 | 8.5 |
| Elongation at break [%] | 535 | 540 | 490 | 500 | 530 | 510 | 540 |
| Modulus of elasticity [MPa]$^a$ | 7.3 | 8.0 | 7.4 | 7.7 | 8.4 | 8.4 | 8.6 |
| Adhesion | very good | very good | very good | very good | very good | very good | very good |

$^a$at 0.5-5.0% elongation.

From table 4 it is evident that all of the adhesives exhibit a good initial strength, good mechanical properties, and good adhesion. The open time of the inventive adhesives of examples 9, 10, and 12, 13, and 14 is significantly longer than that of the adhesives of comparative examples 11, and 15, respectively.

Examples 16 to 18

In accordance with the quantity figures in table 5, the respective thickener in the liquid state, in the absence of moisture, was incorporated homogeneously into adhesive base 2. The resulting adhesives were stored in cartridges at room temperature in the absence of moisture.

The properties of examples 16 to 18 are set out in table 5. The adhesives were applied at an ambient temperature of 25° C. and with an adhesive temperature of 25° C.

TABLE 5

Composition (in parts by weight) and properties of the adhesives of inventive examples 16 and 17 and of comparative example 18.

| | Example | | |
|---|---|---|---|
| | 16 | 17 | 18 (comparative) |
| Adhesive base 2 | 96.0 | 96.0 | 100.0 |
| Polyurethane polymer A1.3 | 4.0 | — | — |
| Polyurethane polymer A1.4 | — | 4.0 | — |
| Sag resistance | 1 | 1 | 3-4 |
| Stringing | short | short | long |

From table 5 it is evident that the two adhesives of examples 16 and 17, each containing a polyurethane polymer A2 as thickener, have good application properties in the form of a very good sag resistance and short stringing. The adhesive of comparative example 18, which does not contain a polyurethane polymer A, in contrast, has a significantly lower sag resistance and longer stringing.

The invention claimed is:

1. A one-component, moisture-curing composition comprising
a) at least one polyurethane polymer P1 which is liquid at room temperature and contains isocyanate groups, and
b) at least one polyurethane polymer A which is solid at room temperature, contains aldimine groups, is of the formula (I a) or (I b), and has a melting point in the range from 40° C. to 80° C.

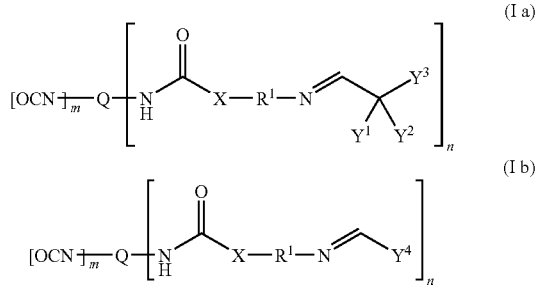

where Q is the radical of a polyurethane polymer P2, which is solid at room temperature and has a melting point in the range from 40° C. to 80° C., after removal of m+n isocyanate groups;

$Y^1$ and $Y^2$ independently of one another either
are each a monovalent hydrocarbon radical having 1 to 12 C atoms, or
together are a divalent hydrocarbon radical having 4 to 20 C atoms which is part of an unsubstituted or substituted carbocyclic ring having 5 to 8 C atoms;
$Y^3$ is a monovalent hydrocarbon radical which optionally contains at least one heteroatom;
$Y^4$
is a substituted or unsubstituted aryl or heteroaryl group which has a ring size of between 5 and 8 atoms, or
is

where $R^6$ is a hydrogen atom or is an alkoxy group, or is a substituted or unsubstituted alkenyl or arylalkenyl group having at least 6 C atoms;
$R^1$ either
is a divalent hydrocarbon radical having 2 to 12 C atoms which optionally contains at least one heteroatom, or,
if X is N—$R^{2'}$, is together with $R^{2'}$ a trivalent hydrocarbon radical having 4 to 12 C atoms which optionally contains at least one heteroatom;
X is O or is S or is N—$R^2$ or is N—$R^{2'}$,
where $R^2$ either
is a monovalent hydrocarbon radical having 1 to 20 C atoms which optionally contains at least one carboxylic ester, nitrile, nitro, phosphonic ester, sulfonyl or sulfonic ester group, or
is a substituent of the formula (II a) or (II b)

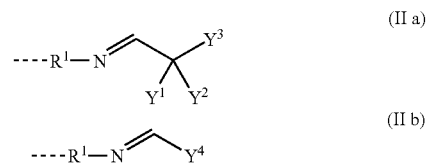

and $R^{2'}$ together with $R^1$ is a trivalent hydrocarbon radical having 4 to 12 C atoms which optionally contains at least one heteroatom;
and n is 1 or 2 or 3, m is 0 or 1 or 2, wherein m+n is 2 or 3.

2. The one-component, moisture-curing composition of claim 1, wherein the polyurethane polymer P1 is present in an amount of 10%-80% by weight, based on the weight of the moisture-curing composition.

3. The one-component, moisture-curing composition of claim 1, wherein m is 0.

4. The one-component, moisture-curing composition of claim 1, wherein m+n is 2.

5. The one-component, moisture-curing composition of claim 1, wherein X is O or is N—$R^2$ or is N—$R^{2'}$.

6. The one-component, moisture-curing composition of claim 1, wherein X is N—$R^2$, where $R^2$ is a monovalent hydrocarbon radical having 1 to 4 C atoms.

7. The one-component, moisture-curing composition of claim 1, wherein the polyurethane polymer A is prepared from a polyurethane polymer P2, which is solid at room temperature, contains isocyanate groups, and has the formula (III), and from an aldimine D of the formula (IV a) or (IV b)

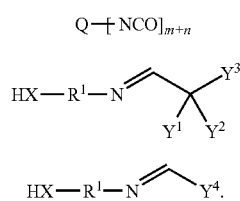

(III)

(IV a)

(IV b)

8. The one-component, moisture-curing composition of claim 7, wherein the polyurethane polymer P2 is prepared from at least one polyol.

9. The one-component, moisture-curing composition of claim 1, wherein the polyurethane polymer P1 and/or the polyurethane polymer P2 are/is prepared using at least one diisocyanate.

10. The one-component, moisture-curing composition of claim 7, wherein the aldimine D is prepared from an amine of the formula (V) and from an aldehyde of the formula (VI a) or (VI b)

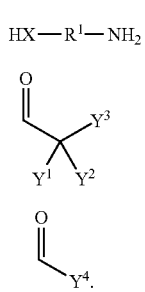

(V)

(VI a)

(VI b)

11. The one-component, moisture-curing composition of claim 10, wherein the amine of the formula (V) is selected from the group consisting of N-methyl-1,2-ethanediamine, N-ethyl-1,2-ethanediamine, N-cyclohexyl-1,2-ethanediamine, N-methyl-1,3-propanediamine, N-ethyl-1,3-propanediamine, N-butyl-1,3-propanediamine, N-cyclohexyl-1,3-propanediamine, 4-aminomethylpiperidine, 3-(4-aminobutyl)piperidine, diethylenetriamine (DETA), dipropylenetriamine (DPTA), bishexamethylenetriamine (BHMT), fatty diamines; products from the Michael-like addition of aliphatic primary diamines with maleic and fumaric diesters, acrylic and methacrylic esters, acrylamides and methacrylamides, reacted in a molar ratio of 1:1; aliphatic hydroxy- or mercaptoamines in which the primary amino group are separated from the hydroxy or mercapto group by a chain of at least five atoms, or by a ring.

12. The one-component, moisture-curing composition of claim 1, wherein the polyurethane polymer A has the formula (I a).

13. The one-component, moisture-curing composition of claim 1, wherein $Y^3$ is a radical of the formula (VII') or (VIII')

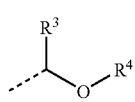

(VII')

-continued

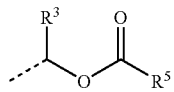

(VIII')

where $R^3$ is a hydrogen atom or is an alkyl or arylalkyl group;

$R^4$ is a hydrocarbon radical having 1 to 30 C atoms which optionally contains heteroatoms; and $R^5$ alternatively is a hydrogen atom, or is a linear or branched alkyl radical having 1 to 30 C atoms, optionally with cyclic fractions and optionally with at least one heteroatom, or is a singly or multiply unsaturated, linear or branched hydrocarbon radical having 5 to 30 C atoms, or is an optionally substituted aromatic or heteroaromatic 5- or 6-membered ring.

14. The one-component, moisture-curing composition of claim 1, wherein the composition contains 0.3%-15%, by weight, of room-temperature solid polyurethane polymer A of the formula (I a) or (I b).

15. A cured one-component, moisture-curing composition of claim 1, wherein the moisture-curing composition has been crosslinked with moisture.

16. A method of adhesively bonding a substrate S1 to a substrate S2, comprising the steps of
  i) heating a one-component, moisture-curing composition of claim 1 to a temperature above the melting point of the polyurethane polymer A of the formula (I a) or (I b);
  ii) applying the heated moisture-curing composition to the substrate S1;
  iii) contacting the applied, moisture-curing composition with the substrate S2 within the open time;
  the substrate S2 being composed of the same or a different material from the substrate S1.

17. The method of claim 16, further comprising following step iii) with a step iv) of displacing the substrate S1 relative to the substrate S2.

18. The method of claim 17, further comprising following step iv) with a step v) of chemically crosslinking the moisture-curing composition with moisture.

19. A method of adhesively bonding a substrate S1 to a substrate S2, comprising the steps of
  i') applying a one-component, moisture-curing composition of claim 1 to the substrate S1;
  ii') contacting the applied composition with the substrate S2 within the open time;
  iii') chemically crosslinking the composition with moisture;
  the substrate S2 being composed of the same or a different material from the substrate S1.

20. The method of claim 16, wherein at least the substrate S1 or S2 is an inorganic substrate; a metal or an alloy; an organic substrate; a coated substrate; or a paint or a finish.

21. The method of claim 16, wherein at least one of the substrates, S1 or S2, is a glass or a glass ceramic.

22. An article adhesively bonded by an adhesive bonding method of claim 16.

23. The article of claim 22, wherein the article is a built structure, or an industrial product or consumer good, a household appliance, or a means of transport, or a component for installation on or in a means of transport.

24. A method of bonding, the method comprising:
providing, a substrate; and
applying the moisture-curing composition of claim 1 to the substrate.

25. A method of influencing the open time and initial strength of a polyurethane composition by means of a melting component, which constitutes a polyurethane polymer P2 which contains isocyanate groups and is of the formula (III), wherein the polyurethane polymer P2 of the formula (III), containing isocyanate groups, is reacted partly or fully with an aldimine D of the formula (IV a) or (IV b)

$$Q\text{—}[NCO]_{m+n} \qquad (III)$$

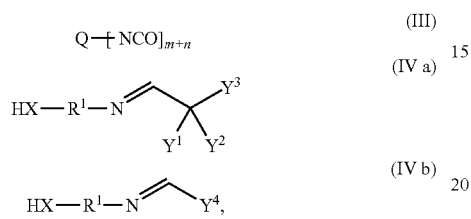

(IV a)

(IV b)

where Q is the radical of a polyurethane polymer P2, which is solid at room temperature and has a melting point in the range from 40° C. to 80° C., after removal of m+n isocyanate groups;

$Y^1$ and $Y^2$ independently of one another either are each a monovalent hydrocarbon radical having 1 to 12 C atoms, or together are a divalent hydrocarbon radical having 4 to 20 C atoms which is part of an unsubstituted or substituted carbocyclic ring having 5 to 8 C atoms;

$Y^3$ is a monovalent hydrocarbon radical which optionally contains at least one heteroatom;

$Y^4$ is a substituted or unsubstituted aryl or heteroaryl group which has a ring size of between 5 and 8 atoms, or is

where $R^6$ is a hydrogen atom or is an alkoxy group, or is a substituted or unsubstituted alkenyl or arylalkenyl group having at least 6 C atoms;

$R^1$ either is a divalent hydrocarbon radical having 2 to 12 C atoms which optionally contains at least one heteroatom, or, if X is N—$R^{2'}$, is together with $R^{2'}$ a trivalent hydrocarbon radical having 4 to 12 C atoms which optionally contains at least one heteroatom;

X is O or is S or is N—$R^2$ or is N—$R^{2'}$, where $R^2$ either is a monovalent hydrocarbon radical having 1 to 20 C atoms which optionally contains at least one carboxylic ester, nitrile, nitro, phosphoric ester, sulfonyl or sulfonic ester group, or is a substituent of the formula (II a) or (II b)

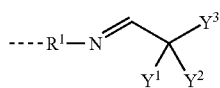

(II a)

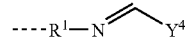

(II b)

and $R^{2'}$ together with $R^1$ is a trivalent hydrocarbon radical having 4 to 12 C atoms which optionally contains at least one heteroatom;

and n is 1 or 2 or 3, m is 0 or 1 or 2, wherein m+n is 2 or 3.

26. A polyurethane polymer A2 which contains aldimine groups, is of the formula (I a') or (I b'), is solid at room temperature, and has a melting point in the range from 40° C. to 80° C.

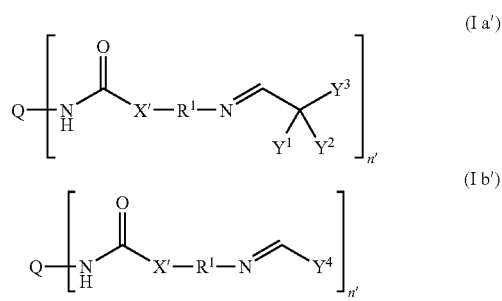

(I a')

(I b')

where Q is the radical of a polyurethane polymer P2, which is solid at room temperature and has a melting point in the range from 40° C. to 80° C., after removal of n' isocyanate groups;

$Y^1$ and $Y^2$ independently of one another either are each a monovalent hydrocarbon radical having 1 to 12 C atoms, or together are a divalent hydrocarbon radical having 4 to 20 C atoms which is part of an unsubstituted or substituted carbocyclic ring having 5 to 8 C atoms;

$Y^3$ is a monovalent hydrocarbon radical which optionally contains at least one heteroatom;

$Y^4$ is a substituted or unsubstituted aryl or heteroaryl group which has a ring size of between 5 and 8 atoms, or is

where $R^6$ is a hydrogen atom or is an alkoxy group, or is a substituted or unsubstituted alkenyl or arylalkenyl group having at least 6 C atoms;

$R^1$ either is a divalent hydrocarbon radical having 2 to 12 C atoms which optionally contains at least one heteroatom, or, if X' is N—$R^{2'}$, is together with $R^{2'}$ a trivalent hydrocarbon radical having 4 to 12 C atoms which optionally contains at least one heteroatom;

X' is O or is N—$R^2$ or is N—$R^{2'}$, where $R^2$ either is an alkyl group having 1 to 4 C atoms, or is —$CHR^7$—$CH_2R^8$, where $R^7$ is a hydrogen atom or is —$COOR^9$ and $R^8$ is a hydrogen atom or is —$COOR^9$ or —$CONHR^9$ or —$CONR^9{}_2$, where $R^9$ is an alkyl group having 1 to 4 C atoms;

and R$^{2'}$ together with R$^1$ is a trivalent hydrocarbon radical having 4 to 12 C atoms which optionally contains at least one heteroatom;
and n' is 2 or 3.

27. The polyurethane polymer of claim 26, wherein polyurethane polymer P2 is prepared from at least one room-temperature liquid, amorphous, partly crystalline or crystalline polyesterdiol or polycarbonatediol, and from a polyisocyanate, the room-temperature liquid polyesterdiol or polycarbonatediol being solid at a temperature between 0° C. and 25° C., and used in combination with at least one amorphous, partly crystalline or crystalline polyesterpolyol and/or polycarbonatepolyol.

28. The polyurethane polymer of claim 26, wherein it is prepared from a room-temperature solid polyurethane polymer P2 of the formula (III'), and from an aldimine D of the formula (IV a') or (IV b')

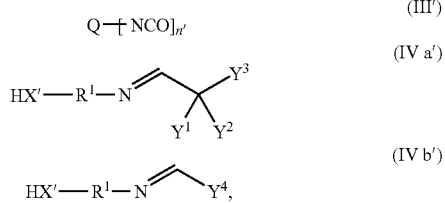

which is in turn prepared from an amine of the formula (V') and from an aldehyde of the formula (VI a) or (VI b)

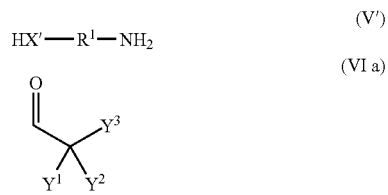

29. The polyurethane polymer of claim 28, wherein the amine of the formula (V') is selected from the group consisting of N-methyl-1,2-ethanediamine, N-ethyl-1,2-ethanediamine, N-methyl-1,3-propanediamine, N-ethyl-1,3-propanediamine, N-butyl-1,3-propanediamine, N-cyclohexyl-1,3-propanediamine, 4-aminomethylpiperidine, 3-(4-aminobutyl)piperidine, and also products of the Michael-like addition of aliphatic primary diamines with maleic and fumaric diesters, acrylic and methacrylic esters, acrylamides and methacrylamides, reacted in a molar ratio of 1:1; aliphatic hydroxy amines in which the primary amino group are separated from the hydroxyl group by a chain of at least five atoms, or by a ring.

30. A method of coating a composition, the method comprising:
providing a substrate; and
applying the polyurethane polymer of claim 26 to the substrate.

31. A method of thickening a composition, the method comprising:
adding the polyurethane polymer of claim 26 to a composition, wherein the composition is applied at temperatures below the melting point of the polyurethane polymer.

32. The one-component, moisture-curing composition of claim 10, wherein the amine of the formula (V) is selected from the group consisting of 5-amino-1-pentanol, 6-amino-1-hexanol, and higher homologs thereof, 4-(2-aminoethyl)-2-hydroxyethylbenzene, 3-aminomethyl-3,5,5-tri-methylcyclohexanol, 2-(2-aminoethoxy)ethanol, tri-ethylene glycol-monoamine and higher oligomers and polymers thereof, 3-(2-hydroxyethoxy)propylamine, 3-(2-(2-hydroxyethoxy)ethoxy)propylamine, and 3-(6-hydroxyhexyloxy)propylamine.

\* \* \* \* \*